United States Patent
Klopping et al.

(10) Patent No.: US 8,978,465 B2
(45) Date of Patent: Mar. 17, 2015

(54) INTERFEROMETRIC GRADIOMETER APPARATUS AND METHOD

(75) Inventors: Fred J. Klopping, Longmont, CO (US);
Ryan M. Billson, Loveland, CO (US);
Timothy M. Niebauer, Boulder, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 260 days.

(21) Appl. No.: 13/558,138

(22) Filed: Jul. 25, 2012

(65) Prior Publication Data

US 2014/0224012 A1 Aug. 14, 2014

(51) Int. Cl.
*G01V 7/14* (2006.01)
*G01V 7/16* (2006.01)
*G01B 9/02* (2006.01)

(52) U.S. Cl.
CPC .. *G01V 7/14* (2013.01); *G01V 7/16* (2013.01); *G01B 9/02016* (2013.01); *G01B 9/02045* (2013.01); *G01B 9/02021* (2013.01)
USPC ...................................... 73/382 G; 73/382 R

(58) Field of Classification Search
USPC .................... 73/382 R, 382 G; 356/28.5, 529
See application file for complete search history.

(56) References Cited

U.S. PATENT DOCUMENTS

| | | | | |
|---|---|---|---|---|
| 3,688,584 A * | 9/1972 | Stone et al. | ................ | 73/382 R |
| 3,693,451 A | 9/1972 | Dunlap et al. | | |
| 3,696,451 A * | 10/1972 | Thompson | .................... | 114/345 |
| 3,704,626 A * | 12/1972 | Stone | .......................... | 73/382 R |
| 3,727,462 A * | 4/1973 | Stone et al. | ................ | 73/382 R |
| 3,865,467 A * | 2/1975 | Von Thuna | .................... | 359/529 |
| 5,305,088 A | 4/1994 | Hosoe | | |
| 5,351,122 A * | 9/1994 | Niebauer et al. | ............. | 356/496 |
| 5,461,914 A * | 10/1995 | Zumberge et al. | .......... | 73/382 R |
| 5,892,151 A | 4/1999 | Niebauer et al. | | |
| 6,082,194 A * | 7/2000 | Gladwin | ..................... | 73/382 G |
| 6,298,722 B1 * | 10/2001 | Faller et al. | ................. | 73/382 R |
| 6,325,172 B1 * | 12/2001 | Langridge et al. | ............ | 181/122 |
| 6,671,057 B2 * | 12/2003 | Orban | .......................... | 356/496 |
| 7,469,585 B2 * | 12/2008 | Meyer | ........................ | 73/382 R |

(Continued)

FOREIGN PATENT DOCUMENTS

CN 102323624 A 1/2012
EP 2348338 A1 7/2011

(Continued)

OTHER PUBLICATIONS

PCT International Search Report with attached Written Opinion of the International Searching Authority for International Application No. PCT/US2013/050800, dated Dec. 10, 2013, 13 pages.

(Continued)

*Primary Examiner* — Helen Kwok
(74) *Attorney, Agent, or Firm* — John R. Ley

(57) ABSTRACT

A gravity gradient is measured interferometrically from two light beams which each reflect from both of two freefalling test masses. The light beams project in beam arms which remain equal in length as the two test masses freefall except for different effects of gravity on each test mass and any initial relative velocity difference imparted to the test masses. The optical path length of the beam arms also change equally and oppositely during freefall, to amplify the interferometric effect by four times. A high level of common mode rejection eliminates many spurious influences.

103 Claims, 15 Drawing Sheets

(56) References Cited

U.S. PATENT DOCUMENTS

| | | | |
|---|---|---|---|
| 8,286,485 B2* | 10/2012 | Benischek et al. | 73/382 R |
| 2003/0081218 A1 | 5/2003 | Orban | |
| 2008/0034855 A1 | 2/2008 | Peeters | |
| 2009/0219546 A1* | 9/2009 | Benischek | 356/482 |
| 2011/0046913 A1* | 2/2011 | Hilby | 702/141 |
| 2013/0205894 A1* | 8/2013 | Rothleitner | 73/382 R |
| 2014/0026654 A1* | 1/2014 | Klopping et al. | 73/382 G |

FOREIGN PATENT DOCUMENTS

| | | |
|---|---|---|
| FR | 2089057 A5 | 1/1972 |
| WO | 2011/086020 A1 | 7/2011 |
| WO | WO 2011/086020 * | 7/2011 |
| WO | 2014/163922 A2 | 10/2014 |

OTHER PUBLICATIONS

PCT International Search Report with attached Written Opinion of the International Searching Authority for International Application No. PCT/US2013/050819, dated Dec. 3, 2013, 14 pages.

Christian Rothleitner, "Ultra-high Precision, Absolute, Earth Gravity Measurements," dissertation, 2008, pp. 1-160, University Erlangen-Nuremberg, Berlin, Germany.

C. Rothleitner et al., "A method for adjusting the centre of mass of a freely falling body in absolute gravimetry," 2007, pp. 234-241, IOP Publishing, Metrologia, Bristol, Great Britain.

A. Vitouchkine et al., "Short Communication—A direct and sensitive method for positioning the centre of mass of a dropping object at the optical centre of the enclosed corner cube in ballistic absolute gravimeters," 2004, pp. L19-L21, Institute of Physics Publishing, Metrologia, Bristol, Great Britain.

T. Niebauer et al., "A new generation of absolute gravimeters," 1995, pp. 159-180, Metrologia.

PCT International Search Report with attached Written Opinion of the International Searching Authority for International Application No. PCT/US2014/018912, dated Oct. 31, 2014, 22 pages.

L. F. Vitushkin et al., "Ballistic Gradiometer for the Measurement of the Vertical Gravity Gradient: A Proposal," pp. 47-51, Proceedings of the IAG Symposium on Airborne Gravity Field Determination at the IUGG XXI General Assembly, Calgary, Aug. 1995, 200 pages, retrieved from the Internet: URL:http://www.ucalgary.ca/engo_webdocs/Special Publications/Proceedings_IAGSymposiumOnAirborneGravityFieldDetermination_1995.pdf.

* cited by examiner

INTERFEROMETRIC GRADIOMETER APPARATUS AND METHOD

This invention relates to measuring a characteristic of gravity, and more specifically, to a new and improved gradiometer and method which directly measures a gradient or change of gravity without the necessity to obtain multiple gravity measurements from which to calculate the gradient. In addition, the present invention relates to a gradiometer and method which employs multiple test masses and multiple light beams which interact advantageously with the test masses to remove or cancel large background gravity signals caused by the earth itself, thereby making it easier to detect gravity gradients created by near field mass-variation sources like high density mineral and ore deposits or low density voids and tunnels while simultaneously enhancing the accuracy of the measurement and facilitating use on dynamic platforms such as marine vessels and aircraft.

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of a point with the mass of the entire earth, $M_e$, located at the center of the earth, a distance, $R_e$, from the surface of the earth. This nominal gravity value, $g = G \times M_e / R_e^2$, is about 9.8 m/s². Thus, the freefall acceleration due to gravity near the earth's surface of an object having a small mass compared to the mass of the earth is about 9.8 m/s². The common unit of measurement for gravity is the "Galileo" (Gal), which is a unit of acceleration defined as 1 cm/s². One Gal generally approximates $\frac{1}{1000}$ ($10^{-3}$) of the force of gravity at the earth's surface. An instrument used to measure gravity is called a "gravimeter."

The most accurate gravimeters are absolute gravimeters. Interferometric absolute gravimeters usually use a freely falling test mass and a laser or single-frequency light beam which reflects from the freely falling test mass. The reflected light beam is combined with a reference light beam to develop interference fringes. Interference fringes are instances where the amplitude or intensity of the reflected and reference light beams add together to create increased intensity, separated by instances where the two beams cancel or create diminished intensity.

Fringes occur on a periodic basis depending upon the change in the optical path length of the reflected beam relative to the optical path length of the reference beam. One fringe occurs whenever the optical path difference between the reflected and reference beams changes by the wavelength of the light of the two beams. When an object that is part of the beam path moves, it typically changes the path length by twice the amount of physical movement because the physical movement changes both the entry and exit of the beam path. In this circumstance, a fringe typically occurs when the object moves by one-half of a wavelength. The fringes taken together as a set comprise a record of the distance that the freely falling body moves.

Because the path length of the reflected beam changes as it is reflected from the freely falling test mass, and because the freefall movement of the test mass is established by gravity, the occurrence and timing of the resulting interference fringes defines the characteristic of gravity. The use of optical fringe interferometry to measure gravity characteristics is well-known. U.S. Pat. No. 5,351,122 describes an example of an absolute gravity measuring instrument, called a "gravimeter."

A gradient of gravity is the rate at which gravity changes in a certain direction and over a certain distance. A gravity gradient is therefore the change or first derivative of the gravity over distance. Near-field variations in gravity are caused by localized variations in the mass or density of at least one of the two attracted bodies. An instrument used to measure a gradient of gravity is called a "gradiometer."

Although the gradient of gravity can be determined in any direction, the vertical gradient of gravity is useful in many practical applications. Vertical gravity gradients identify changes in density or mass of a particular material or geological structure. For example, gravity gradients are used to establish the location of underground geological structures, such as a pool of liquid petroleum encased within an earth formation, narrow seams or "tubes" of high density geological materials such as diamonds or cobalt, or voids in a geographical formation caused by a tunnel or cavern. These changes in the subterranean material density are most measurable within a relatively short near-field distance, typically within a few hundred meters.

Subsurface density anomalies, for example from valuable nearby high density ore bodies or voids caused by tunnels or areas of low density material, affect the local value of gravity, g, at a level of about 1 part per million ($\frac{1}{10^6}$), and in some cases 1 part per billion ($\frac{1}{10^9}$). The large background of the earth's gravity requires that any direct gravity measurement to detect such subsurface anomalies have a very large dynamic range of parts per billion, otherwise direct gravity measurements will not be useful for locating and detecting such subsurface density anomalies. It is difficult to make gravimeters with such levels of extremely high precision, so it is desirable to find ways to cancel the large effect of the earth's gravity while preserving the ability to detect gradations in nearby density anomalies.

The vertical gravity gradient of the earth is typically measured in terms of a unit called the Eotvos unit, E, given by $10^{-9}/s^2$. The vertical gravity gradient of the entire earth is typically about 3000E. Typical nearby mass anomalies can affect the vertical gravity gradient at a level of about 1 E or more. Thus, the contrast of the vertical gravity gradient caused by nearby mass anomalies to the earth's vertical gravity gradient is about 300,000 ($3 \times 10^5$) times larger than for the gravity value itself. This means that a vertical gravity gradiometer can have $3 \times 10^5$ times less precision than a gravimeter and still be used effectively to detect or locate nearby mass or density anomalies.

A gradiometer removes the effect of gravity. Logically, a gradiometer differences the gravity measurements at two different nearby locations. A known vertical gravity gradiometer is made by placing two gravimeters above one other with a vertical separation of fixed distance, z, and then subtracting the two gravity measurements, $g_1$ and $g_2$. The vertical gravity gradient, $\gamma$, is then given by the ratio of this difference divided by the vertical separation, i.e. $\gamma = (g_2 - g_1)/z$. This quantity is also mathematically referred to as the spatial derivative of gravity in the vertical direction.

One or more absolute gravimeters can be used to measure the gravity at the different locations, typically one above the other. The gravity measurements are subtracted and then the result is divided by the distance between the locations of the two gravity measurements to obtain a gravity gradient measurement.

The separate gravity measurements can be obtained approximately simultaneously with multiple instruments or at separated time intervals with the same instrument if the gravity is not expected to change significantly between the times of the multiple measurements. The distance between the locations of these separate measurements is also measured. Each of these multiple separate measurements involves some risk and amount of error.

Each gravimeter used in measuring the gravity is also subject to naturally-occurring and man-made vibrations and other physical perturbations. These vibrations and perturbations cause minute changes in the path length of the reflected and reference light beams in a light beam interferometric instrument, causing interference fringes which are not related to the gravity characteristic measured. Such anomalous interference fringes reduce the accuracy of the measurement and enhance the potential for errors. Further still, each of the instruments is subject to unique vibrations and physical perturbations, which magnify the range of error when the measurements are subtracted from one another.

Attempts have been made to eliminate the anomalous vibration and perturbation errors through common mode rejection. In theory, connected-together instruments are subject to the same physical influences, thereby introducing the same error into all the measurements. When the measurements are subtracted, the common error in both signals is theoretically canceled or rejected. However, the practical effect falls substantially short of complete common mode rejection.

It is practically impossible to achieve a sufficiently rigid connection between the two instruments to cause both to experience the same degree of perturbation. It is impossible to freefall the test masses of the instruments at the same time, so each measurement is always subject to anomalies that do not influence the other measurement. The environments in which the test masses fall in the separate instruments are not the same, despite the attempt to create a vacuum around the test masses in the instruments. The vacuum surrounding each test mass has a slightly different amount of residual gas which creates a slightly different aerodynamic drag on each freefalling test mass. The different amounts of aerodynamic drag influence the freefall characteristics of each test mass differently, thereby introducing discrepancies. Further still, the optics which conduct the light beams in the connected instruments are slightly different, and those differences introduce unique discrepancies. Even slight changes in temperature or pressure may affect the optics of each instrument differently. Physical movement caused by vibration or perturbation of the external optical fibers or elements which conduct the input and output light beams into and from each instrument introduce unique phase shifts, which also influence the measurements. Separate laser light sources for each instrument create unique phase changes in the light beams, which introduce anomalous fringe effects that may introduce measurement errors. Inadvertent slight angular rotation or tilting of one or both the test masses during simultaneous freefall changes the length of the reflected light paths in that instrument, which again contributes to error when the two gravity measurements are subtracted to determine the differential gradient of gravity.

These and other unique and adverse influences increase the possibility of deriving inaccurate measurements. In addition, the mathematical manipulations of subtracting the measurements and dividing by the distance between the measurement locations may compound the errors. These and other errors are not subject to common mode rejection, because the errors uniquely affect some singular aspect of one instrument and not any other instrument used. The inability to achieve effective common mode rejection makes the measurement of a gradient of gravity using gravimeters error-prone, particularly in vibration-prone or perturbation-prone environments.

SUMMARY OF THE INVENTION

This invention permits the direct measurement of the gradient of gravity, or the first spatial derivative of gravity, without the need to use gravimeters to make independent measurements at different times under different conditions, and then mathematically calculate the value of the gradient of gravity from the multiple separate measurements. The effects of background gravity are inherently eliminated during the measurement, thereby greatly facilitating the detection of near field mass-variation sources such as high-density mineral or ore deposits or ore low-density underground voids or tunnels. The invention achieves a significantly enhanced signal-to-noise ratio when measuring the gradient of gravity caused by such near field sources, making the measurements easier to accomplish and more reliable.

In addition, the invention solves or ameliorates many of the known problems or disadvantages of using optical interferometric gravity or acceleration measuring instruments with freely falling test masses to obtain gravity- or acceleration-related measurements. A high level of common mode rejection of a variety of error-inducing adverse influences is achieved, including those caused by compounding errors from separate measurements when making mathematical calculations, from differences in path length of reflected and reference light beams, from physical perturbation and vibration, from variance in angular rotation of falling test masses, from differences in atmospheric composition of separate vacuum chambers, from differences caused by pressure and temperature changes, and from other things. The improvements of the invention, coupled with its single direct measurement capability, makes the invention practical to use in moving land, sea, air and space vehicles, as well as in many other commercial and industrial applications. These and other features and benefits are achieved by different aspects of the invention, which are generally summarized below.

One aspect of the invention involves a gradiometer for measuring a gradient of gravity between two predetermined separated locations by interferometry of first and second light beams. First and second test masses are released for simultaneous freefall solely under the influence of gravity, with each test mass at a different one of the two separated locations. An arrangement of optical elements directs the first and second light beams into first and second separate and different beam arms, respectively. The first beam arm directs the first light beam to impinge upon and reflect from both test masses during their simultaneous freefall, and the second beam arm directs the second light beam to impinge upon and reflect from both test masses during their simultaneous freefall. An interferometric combination of the light beams delivered from the first and second beam arms after impingement upon and reflection from the test masses directly defines the gradient of gravity.

Another aspect of the invention involves a method of measuring a gradient of gravity between two predetermined separated locations. A first test mass falls freely solely under the influence of gravity at one of the separated locations, and a second test mass falls freely solely under the influence of gravity at the other one of the separated locations and simultaneously during at least a portion of the time when the first test mass is freefalling. A first light beam in a first beam arm is directed to impinge upon and reflect from both first and second test masses during simultaneous freefall of both test masses, and a second light beam in a second beam arm is directed to impinge upon and reflect from both first and second test masses during simultaneous freefall of both test masses. The first and second light beams from the first and second beam arms are combined after the first and second light beams have impinged upon and reflected from both test masses during simultaneous freefall of the test masses. The gradient of gravity is determined directly from interference characteristics of the combined first and second light beams.

Subsidiary features of one or both of these aspects of the invention include some or all of the following. The optical path lengths of each beam arm are equal in length at one point in the simultaneous freefall. Changes in the respective optical path lengths during simultaneous freefall are equal and opposite. The test masses freefall in a single vacuum chamber, and in a parallel or collinear relationship with one another. A substantial majority of the first and second beam arms are parallel to the paths in which the test masses freefall. The first and second light beams may be obtained by splitting light beams from a single constant frequency light source, or from separate differing frequency, constant frequency light sources. An initial finite freefall velocity of one test mass compared to the other test mass may be established at the commencement of simultaneous freefall.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
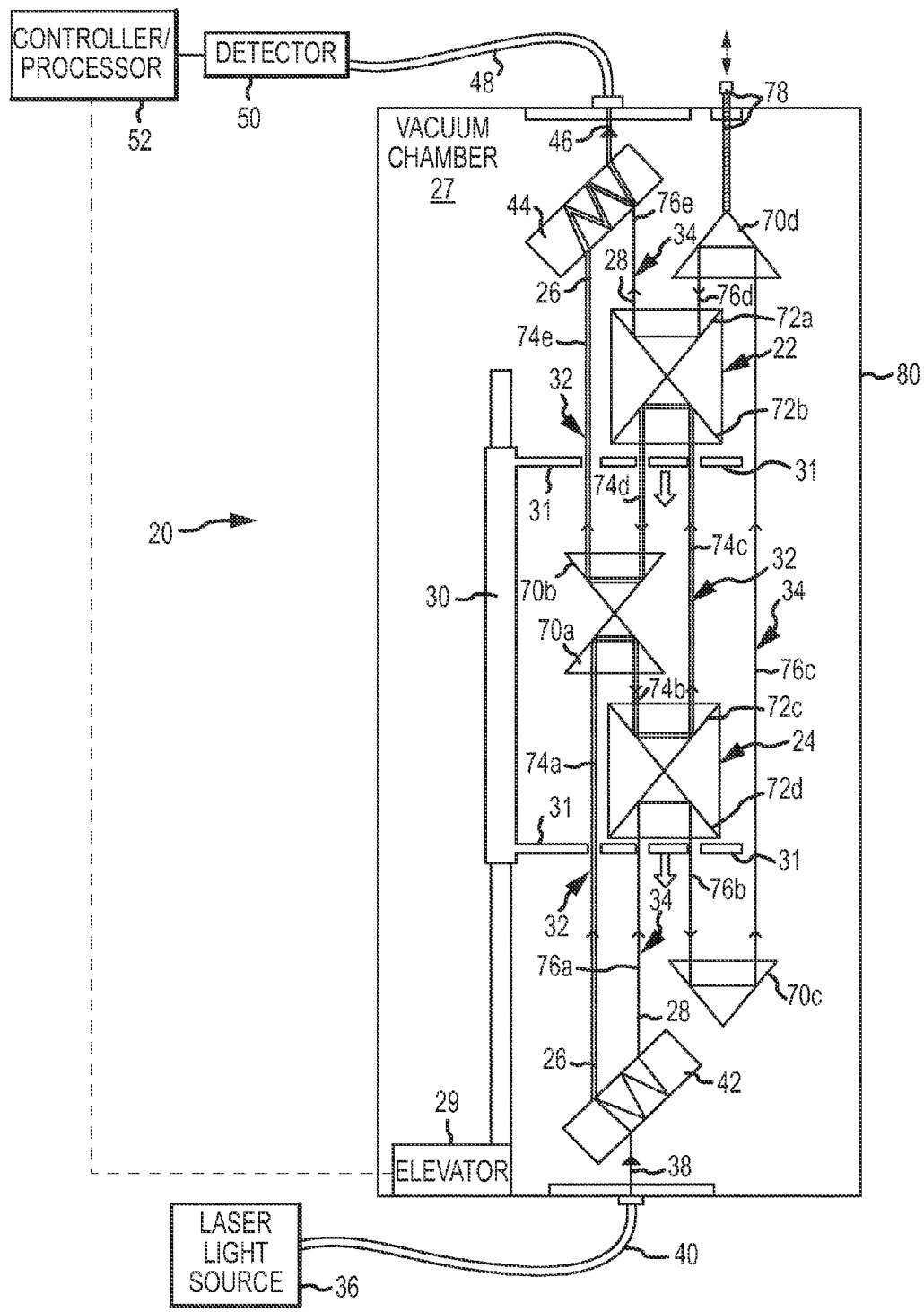
FIG. 1 is a generalized block and schematic diagram of an optical interferometric gradiometer which embodies the present invention.

The present invention involves an optical interferometric gravity gradiometer 20, shown in FIG. 1, but aspects of the invention may be embodied in other devices and methods for measuring a characteristic of gravity. The gradiometer 20 is used to measure a gradient of gravity represented by the relative difference in gravity experienced by two test masses 22 and 24 which are released to fall freely and simultaneously only under the influence of gravity. The force of gravity acting on the lower test mass 24 is very slightly greater than the force of gravity acting on the upper test mass 22, since the lower test mass 24 is closer to the center of the earth's mass and therefore experiences a slightly greater gravitational force.

The slightly greater gravity on the lower test mass 24 causes it to experience a slightly greater downward acceleration compared to the downward acceleration of the upper test mass 22 during simultaneous freefall. The slightly greater acceleration of the lower test mass 24 causes the lower test mass 24 to increase its downward velocity slightly more than the downward velocity of the upper test mass 22 increases during freefall, thereby slightly increasing the physical separation between the two test masses 22 and 24 at the end of their simultaneous freefall compared to the physical separation of the test masses 22 and 24 at the beginning of their simultaneous freefall. An elevator 29, an elevator frame 30 and support devices 31 support the test masses 22 and 24, release the test masses 22 and 24 to fall freely solely under the influence of gravity, and catch the test masses 22 and 24 at the end of their simultaneous freefall.

Two light beams 26 and 28 impinge upon and reflect from both of the test masses 22 and 24 while they fall freely within a vacuum chamber 27. The light beams 26 and 28 traverse the interior of the vacuum chamber 27 over optical paths referred to herein as beam arms 32 and 34, respectively. The beam arms 32 and 34 are oriented to cause each light beam 26 and 28 to impinge on and reflect from both test masses 22 and 24.

The light beams 26 and 28 enter the beam arms 32 and 34 are derived from a single constant-frequency light source 36, such as a laser. A single input light beam 38 from the light source 36 is conducted through an optical fiber 40 to a beam splitter 42, and the beam splitter 42 creates the two light beams 26 and 28. Consequently, the light beams 26 and 28 in the beam arms 32 and 34 have essentially the same frequency characteristic. As an alternative to conducting the input light beam 38 through the optical fiber 40, mirrors could be used or the optical fiber 40 could be eliminated altogether by directly connecting the light source 36 to a housing 80 of the gradiometer 20 and directly injecting the light beam 38 into the gradiometer 20.

When the light beams 26 and 28 pass through the beam arms 32 and 34 and interact with both freely falling test masses 22 and 24, the increasing physical separation of the two test masses during simultaneous freefall creates a changing relative phase relationship of the reflected light beams 26 and 28 in the beam arms 32 and 34. The changed phase relationship results from the change in the relative lengths of the beam arms 32 and 34 during simultaneous freefall of the test masses 22 and 24. After passing through the beam arms 32 and 34, the light beams 26 and 28 are combined in a beam combiner 44 as an output light beam 46. Combining the light beams 26 and 28 with their relatively changing phase relationship into the single output light beam 46 creates well known optical interference fringes. The interference fringes characterize the change in physical separation of the test masses during simultaneous freefall, and that change in physical separation and other information correlates to the gradient of gravity.

An optical fiber 48 conducts the output light beam 46 to a conventional detector 50. The detector 50 generates signals which correspond to characteristics of the output light beam 46 including the interference fringes created by combining the light beams 26 and 28. A controller/processor 52 responds to signals from the detector 50 which represent the interference fringes and the timing of those fringes to determine the gradient of gravity, using known interferometric analysis and processing techniques and from the known distance which separates the test masses 22 and 24. As an alternative to conducting the output light beam 46 through the optical fiber 48, mirrors could be used or the optical fiber 48 could be eliminated altogether by directly connecting the detector 50 to the housing 80 of the gradiometer 20 to directly receive the output light beam 46 from the combiner 44.

The geometry and optical components of the beam arms 32 and 34 includes four conventional corner cube retroreflectors 70a-70d positioned within the vacuum chamber 27. The retroreflectors 70a, 70b and 70c are fixed in position, and the retroreflector 70d is adjustable in position. The test masses 22 and 24 each include upward facing open retroreflectors 72a and 72c and downward facing open retroreflectors 72b and 72d, respectively. The downward facing retroreflectors 72b and 72d face in the same direction that the test masses freefall, and the upward facing retroreflectors 72a and 72c face in the opposite direction from the direction that the test masses 22 and 24 freefall. The retroreflectors 72a, 72b and 72c, 72d are connected as a part of the test masses 22 and 24, respectively.

The beam arms 32 and 34 include five segments 74a-74e and 76a-76e, respectively, all of which extend in sequence from the beam splitter 42 to the beam combiner 44. The beam splitter 42 delivers the light beam 26 into the first segment 74a of the beam arm 32. The light beam 26 in the first segment 74a impinges upon and reflects from the retroreflector 70a into the second segment 74b of the beam arm 32. Light from the second segment 74b impinges upon and reflects from the upward facing retroreflector 72c of the lower test mass 24 into the third segment 74c of the beam arm 32. Light from the third segment 74c impinges upon and reflects from the downward facing retroreflector 72b of the upper test mass 22 into the fourth segment 74d of the beam arm 32. Light from the fourth segment 74b impinges upon and reflects from the retroreflector 70b into the fifth segment 74e of the beam arm 32 leading to the beam combiner 44.

The beam splitter 42 delivers the light beam 28 into the first segment 76a of the beam arm 34. The light beam 28 in the first segment 76a impinges upon and reflects from the downward facing retroreflector 72d of the lower test mass 24 into the second segment 76b of the beam arm 34. Light from the second segment 74b impinges upon and reflects from the retroreflector 70c into the third segment 76c of the beam arm 34. Light from the third segment 76c impinges upon and reflects from the retroreflector 70d into the fourth segment 76d of the beam arm 34. The upward facing retroreflector 72a of the upper test mass 22 reflects the light from the fourth segment 76d into the fifth segment 74e of the beam arm 34 leading to the beam combiner 44.

An important aspect of the optical geometry arrangement shown in FIG. 1 is that the light beams 26 and 28 each reflect from one upward facing retroreflector of one test mass and from one downward facing retroreflector of the other test mass. Specifically, the light beam 26 reflects from the upward facing retroreflector 72c of lower test mass 24 and the downward facing retroreflector 72b of the upper test mass 22, and the other light beam 28 reflects from the downward facing retroreflector 72d of the lower test mass 24 and the upward facing retroreflector 72a of the upper test mass 22.

The slightly different effects of gravity on the test masses 22 and 24 during their simultaneous freefall change the lengths of the beam arms 32 and 34. The relative change in the lengths of the beam arms 32 is four times the amount of relative physical separation of the test masses 22 and 24 during simultaneous freefall. The amplification factor of four facilitates recognition of the fringes by the detector 50 and the controller/processor 52, thereby permitting more accurate calculations of the gradient of gravity.

This relationship of the four times change in relative length of the beam arms 32 and 34 relative to the physical separation distance of the test masses 22 and 24 is demonstrated by the following mathematical derivation.

When the lower test mass 24 falls a distance $Z_L$, the beam arm 34 is shortened by a distance, $2Z_L$, because the downward movement of the test mass 24 shortens each beam arm segment 76a and 76b by the amount $Z_L$, resulting in shortening of the overall length of the beam arm 34 by the distance $2Z_L$. Simultaneously, the other beam arm 32 is lengthened by the same amount, $2Z_L$, because each beam arm segment 74b and 74c is lengthened by the amount $Z_L$, resulting in lengthening of the overall length of the beam arm 32 by the $2Z_L$. Similarly, if the upper test mass 22 falls a distance of $Z_u$, the beam arm 34 is lengthened by a distance of $2Z_u$, because the downward movement of the test mass 22 lengthens each of the beam arm segments 76d and 76e by the amount $Z_u$, resulting in lengthening the overall beam arm 34 by the distance $2Z_u$. Simultaneously, the other beam arm 32 is shortened by the same amount $2Z_u$, because the beam arm segments 74c and 74d are each shortened by the amount $2Z_u$, resulting in shortening the overall beam arm 32 by the distance $2Z_u$.

When both test masses 22 and 24 fall freely at the same time, the length or optical path distance of the beam arm 34 will be changed by the difference of the changes in the beam arm 34 caused by each of freely falling test masses 22 and 24. That changed amount, referred to as $\Delta BA_{34}$ is equal to $2Z_u - 2Z_L$, or $2(Z_U - Z_L)$. Similarly, the length or optical path distance of the beam arm 32 will be changed by the difference of the changes in the beam arm 32 caused by each of the freely falling test masses 22 and 24. That changed amount, referred to as $\Delta BA_{32}$ is equal to $2Z_L - 2Z_u$, or $2(Z_L - Z_U)$.

Figure 2:
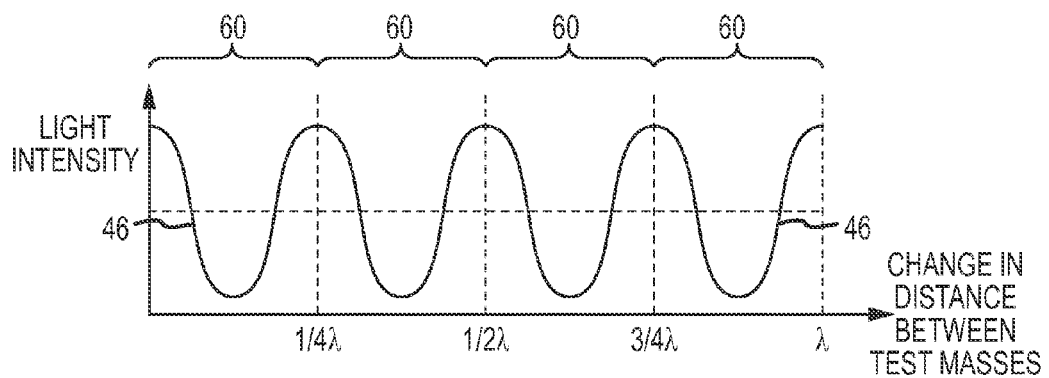
FIG. 2 is a generalized illustration of interference fringes which occur during simultaneous freefall of test masses of the gradiometer shown in FIG. 1.

When light beams 26 and 28 from the two changed-length beam arms 32 and 34 are combined by the beam combiner 44, the combined output light beam 46 contains a sinusoidal interference fringe signal whose phase is given by the difference in path length of the two beam arms 32 and 34. The difference in optical path length of the two beam arms 32 and 34, referred to herein as $\Delta L$, is equal to the difference in change in length of the two beam arms 32 and 34, i.e. $\Delta BA_{34}$ and $\Delta BA_{32}$, respectively. Stated mathematically, $\Delta L = \Delta BA_{34} - \Delta BA_{32}$, or $\Delta L = 2(Z_U - Z_L) - 2(Z_L - Z_U)$, or $\Delta L = 4(Z_U - Z_L)$. This mathematical development shows that the gradiometer 20 produces a sinusoidal interference fringe signal that has a phase change equal to 4 times the relative difference in the free-fall distances of the two freely falling test masses. This relationship is shown in FIG. 2, where four interference fringes 60 in the output light beam 46 occur for each relative change in distance between the two test masses equal to one wavelength ($\lambda$) of the input light beam 38 (FIG. 1).

The relationship of the number of fringes 60 relative to the change in the light beam path lengths caused by movement of the test masses is known as an amplification factor. The gradiometer 20 produces an amplification factor of four in terms of the number of interference fringes 60 (FIG. 2) created for each relative wavelength difference in path lengths of the two beam arms 32 and 34 while the test masses 22 and 24 freefall simultaneously. The amplification factor of four from the gradiometer 20 is twice the amplification factor from a normal Michelson interferometer of the type used in most absolute gravimeters such as the one described in U.S. Pat. No. 5,351,122.

The amplification effect from the gradiometer 20 can also be understood generally in terms of a differential frequency shift of the light beams 26 and 28 in each of the beam arms 32 and 34 due to the well-known Doppler effect. The relative Doppler shift of light for a moving observer is given by the equation $f = f_o\{(1+v/c)/[(1-(v/c)^2]^{1/2}\}$, where $f_o$ is the frequency of light in the rest frame of reference and f is the frequency in the moving frame of reference, v is a velocity of the moving observer, and c is the speed of light. For velocities that are much smaller than the speed of light, which is the case with respect to the freefalling test masses 22 and 24, a first-order approximation is sufficient, so that $f \cong f_o (1+v/c)$. The change in the frequency, $\Delta f = f - f_o$, therefore is proportional to the ratio of the velocity of the observer to the speed of light or $\Delta f = v/c \, f_o$.

The Doppler shift of a light beam reflecting from a moving mirror is twice this value or $\Delta f = 2 \, v/c \, f_o$. This can be understood because the moving mirror "sees" a Doppler shifted beam and then emits this new frequency upon reflection. However the new emitted Doppler shifted frequency is again Doppler shifted in the same manner when observed by the stationary observer, which in the case of the gradiometer 20, is any nonmoving portion of it. Each light beam 26 and 28 therefore experiences a Doppler shift which is related to twice the velocity of the moving mass 22 and 24 from which the light beam reflects.

Each downward freefalling test mass shifts the light beam higher in frequency when the light beam reflects from the downward facing retroreflector and lower in frequency when the light beam reflects from the upward facing retroreflector. The light beam in each beam arm reflects off of the downward facing retroreflector of one freefalling test mass and the upward facing retroreflector of the other freefalling test mass with the net effect of giving an overall Doppler shift proportional to twice the difference in the velocities of the two falling test masses. The light beam in the other beam arm is Doppler shifted in the other direction. When the beams are recombined, a signal with a frequency given by the difference of the frequency of the light beam in each beam arm or twice the Doppler shift in the light beam in one beam arm is created. The resulting signal in the recombined output light beam is given by a Doppler shift proportional to four times the differential velocity of the two falling test masses. This factor of four is the same factor of four increase in signal arrived at using the description of optical path length difference in the two beam arms.

The length of the beam arms 32 and 34 is equal at one point during the simultaneous freefall of the test masses 22 and 24. The change in length of the beam arms 32 and 34 occurs equally and oppositely in each beam arm, i.e. the beam arm 32 increases in length while the beam arm 34 decreases in length, or vice versa. The change in length of the beam arms from the equality point is due only to the slightly different influence of gravity on each test mass, which causes a slightly different acceleration of each test mass, and any initial relative velocity difference imposed upon the two test masses at the commencement of simultaneous freefall, as is discussed in greater detail below. If both test masses 22 and 24 were subject to the same force of gravity and no initial velocity difference was imparted to the test masses, the beam arms 32 and 34 would remain equal in length throughout the simultaneous freefall. When the beam arms 32 and 34 change to respectively different lengths, interference fringes are created because the unequal path lengths cause the light beam in one beam arm 32 or 34 to travel a different distance than the light beam travels in the other beam arm 34 or 32, resulting in relative phase changes which cause the interference fringes 60 (FIG. 2) that are detected and processed to measure the gradient of gravity.

The equal length of the beam arms 32 and 34, except for the slight variations in length caused by the slightly different influence of gravity on each test mass and any initial relative velocity difference imparted between the two test masses, is particularly important in eliminating the adverse effects which arise from slight frequency and phase variations in the laser light source 36. Most laser light sources 36 are subject to slight frequency and phase variations during normal operation. In addition, movement of the optical fiber 40 can also introduce frequency and phase relationships in the input light beam 38 delivered to the beam splitter 42. Even further still, if for some unanticipated reason, the beam splitter 42 should move unexpectedly relative to the input light beam 38, the light beams 26 and 28 will contain the slight frequency and phase variations. Any of these circumstances cause the light beams 26 and 28 leaving the beam splitter 42 to have slight frequency and phase variations.

When the length of the beam arms 32 and 34 is different, the phase or frequency variation one light beam 26 or 28 passing through the different length beam arm 32 or 34 becomes shifted significantly relative to the phase or frequency variation of the other light beam 28 or 26 passing through the other beam arm 34 or 32, due to a significant difference in length of the beam arms 32 and 34. The shifted phase or frequency relationships in the two beam arms can create anomalous fringes when the light beams 26 and 28 are combined in the output light beam 46 from the beam combiner 44 because one of the light beams 26 and 28 takes longer to propogate through one of the beam arms than the other beam arm due to unequal path lengths in the beam arms 32 and 34. These anomalous fringes result from the difference in the length of the beam arms 26 and 28 and not from the differing effects of gravity influencing the freefalling test masses 22 and 24. The anomalous fringes make it difficult to accurately measure the differing effects of gravity on the test masses 22 and 24 and introduce a source of uncertainty or error into the measurement of the gravity gradient.

Maintaining the beam arms 32 and 34 at the same length in the gradiometer 20, other than from the differing effects of gravity and initial relative velocity differences of the test masses, allows any phase or frequency shift created by operation of the laser light source 36 or from movement of the optical cable 40 or the beam splitter 42 to equally affect both light beams 26 and 28 and propogate through the beam arms 32 and 34 at the same time. Consequently, when the light beams 26 and 28 are recombined in the beam combiner 44, the phase and frequency shift effects on each light beam 26 and 28 are canceled by common mode rejection and do not create anomalous fringes. Maintaining the beam arms 32 and 34 at approximately the same length achieves this advantageous common mode rejection.

Although the differing effects of gravity on each of the test masses 22 and 24 and an initial velocity difference imposed on the test masses 22 and 24, results in a slight difference in path length in the beam arms 32 and 34, that amount of difference is not significant relative to the amount of phase or frequency shift created by normal operation of the laser light source 36 or from movement of the optical cable 40 or the beam splitter 42. Thus, the slight difference in length of the beam arms 32 and 34 arising from the differing effects of gravity and initial relative velocity differences, does not significantly diminish the beneficial effects of common mode rejection created by the substantially equal length beam arms 32 and 34 in the gradiometer 20.

Figure 4:
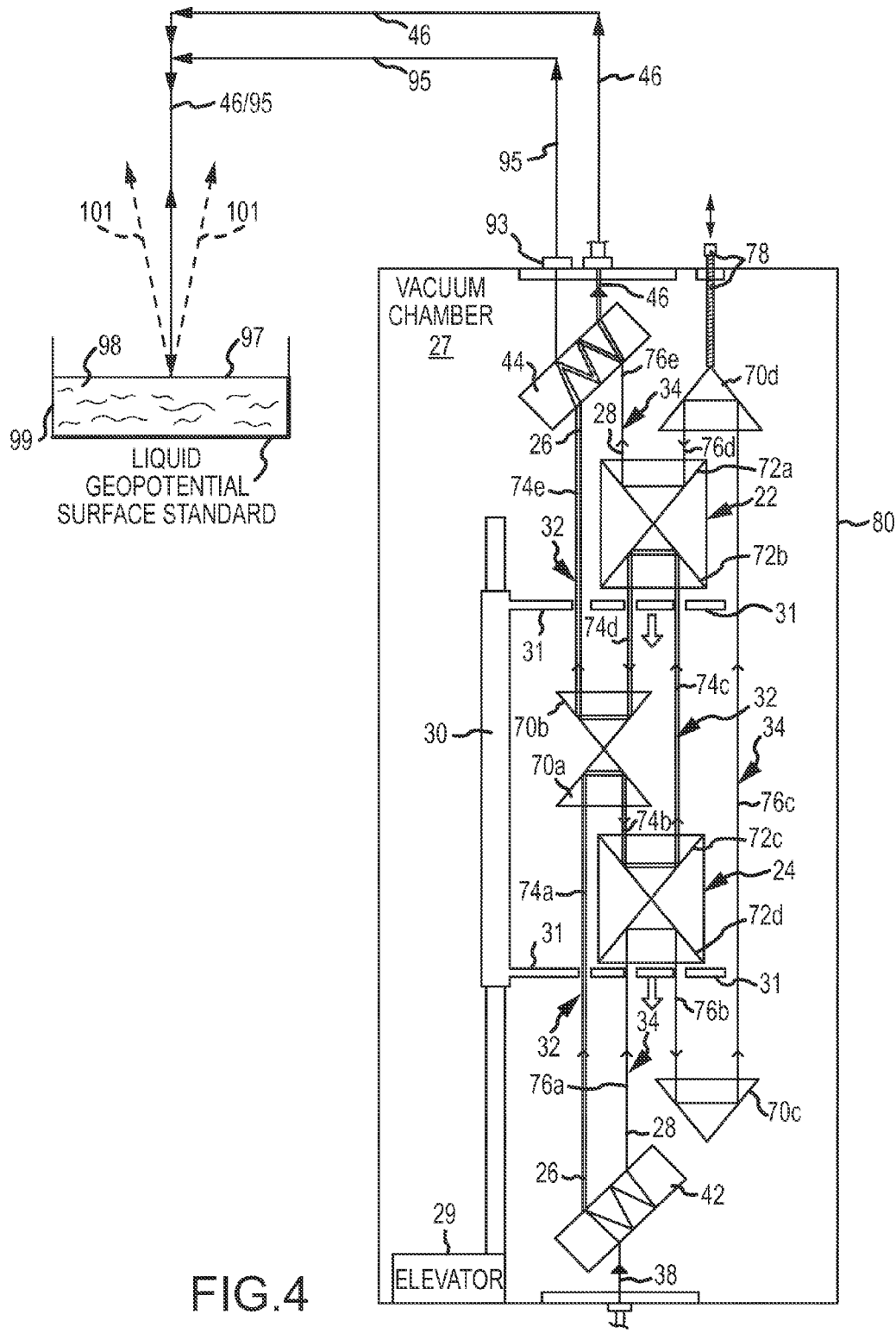
FIG. 4 is a diagram showing portions of the gradiometer shown in FIG. 1, used with a liquid geopotential surface standard to establish a vertical orientation of test masses within the gradiometer.

The beam arms 32 and 34 are calibrated to have equal lengths by adjusting the vertical position of the retroreflector 70d in the beam arm 34. The position of the retroreflector 70d is adjusted by manipulation of an adjustment device, such as a micrometer screw 78 as shown in FIG. 4, which extends through a housing 80 that defines the vacuum chamber 27. Adjusting the vertical position of the retroreflector 70d changes the length of the beam arm segments 76c and 76d, and therefore changes the entire length of the beam arm 34.

A multiple frequency light beam, such as a Mercury band limited light beam, is used as the input light beam 38 for purposes of calibrating the length of the beam arms 32 and 34. The test masses are positioned stationarily at a position that they would occupy when the test masses commence freely falling. So long as the beam arms 32 and 34 are not equal in length, optical fringes will result in the output light beam 46 in response to the multiple frequency input light beam. When the length of the beam arm 34 is adjusted to equal the length of the beam arm 32, by adjusting the position of the retroreflector 70d, the output light beam 46 no longer includes any optical fringes. The process flow for achieving equality in the length of the beam arms 32 and 34 is further described below in connection with FIG. 14.

The beam arms 32 and 34 within the vacuum chamber 27 are inherently parallel to one another, despite the movement of the test masses 22 and 24. If the beam arms 32 and 34 were not parallel to one another, the non-parallel deviation of one of the beam arms would cause it to have a different length compared to the other beam arm. Such a difference in path length would cause the light beam in one beam arm to travel a different distance than the light travels in the other beam arm, resulting in relative phase changes between the light beams 26 and 28. Such resulting phase shifts from unequal beam arm lengths would create erroneous interference fringes that would lead to errors in determining the gradient of gravity or other characteristic of gravity being measured.

The use of a parallel surface beam splitter 42 and a parallel surface beam combiner 44 contributes to the parallelism in the beam arms 32 and 34. An inherent characteristic of the parallel surfaces of the beam splitter 42 is that the two light beams 26 and 28 are delivered in a parallel relationship. Furthermore, the two light beams 26 and 28 extend in a parallel relationship with the input light beam 38. A similar situation exists with respect to the beam combiner 44, since the beam combiner 44 is a beam splitter used for the opposite purpose. The optical characteristics of the beam combiner 44 are the same as the beam splitter 42, causing parallel light beams 26 and 28 leaving the beam arms 32 and 34 to be combined accurately in the single output beam 46 while preserving their relative phase relationship. The beam combiner 44 delivers the output signal 46 in parallel relationship to the light beams 26 and 28 delivered from the beam arms 32 and 34.

The parallel surface beam splitter 42 and the parallel surface beam combiner 44 also contribute to maintaining the previously-described substantial equality in the optical path lengths. An inherent characteristic of the parallel surface beam splitter 42 and beam combiner 44 is that the optical path length of the first light beam 26 in the beam splitter 42 added to the optical path length of the first light beam 26 in the beam combiner 44 is equal to the optical path length of the second light beam 28 in the beam splitter 42 added to the optical path length of the second light beam 28 in the beam combiner 44. As a consequence, the light beams passing through the parallel surface beam splitter 42 and beam combiner 44 retain a substantial equality in optical path length in the beam arms 32 and 34.

The use of conventional corner cube retroreflectors 70a-70d and 72a-72d also contributes to the parallelism. Changes in direction of the light beams 26 and 28 within the vacuum chamber 27 are achieved only by the retroreflectors 70a-70d and 72a-72d. Use of the retroreflectors to change the direction of the light beams ensures parallelism in the beam arms 32 and 34, thereby maintaining equal path lengths, as is understood from the following discussion of a single conventional retroreflector 75 shown in FIGS. 3A-3C. The retroreflector 75 exemplifies the characteristics of each retroreflector 70a-70d and 72a-72d.

Figure 3A:
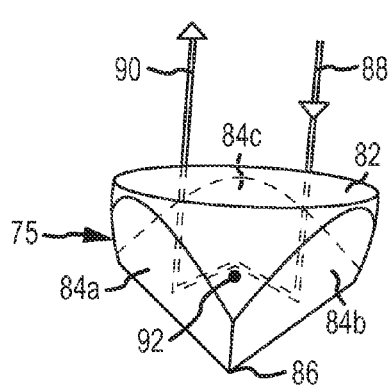
FIGS. 3A, 3B and 3C are perspective views of a conventional corner cube retroreflector of the type used in the gradiometer shown in FIG. 1, each showing an incident light beam and a reflected light beam.

As shown in FIG. 3A, the retroreflector 75 is constructed of glass or other high-grade transparent optical material. An entry-exit surface 82 and three mutually perpendicular wall surfaces 84a-84c are machined or otherwise formed on the retroreflector 75. The wall surfaces 84a-84c intersect one another perpendicularly and define a corner 86 which faces toward the entry-exit surface 82. The wall surfaces 84a-84c extend at the same angle relative to the entry-axis surface 82. The wall surfaces 84a-84c are coated with a reflective material (not shown) to cause light impinging on the wall surfaces 84a-84c to reflect.

An incident light beam 88 enters the entry-exit surface 82 and reflects off of the reflective wall surfaces 84a-84c and then exits the retroreflector 75 through the entry-exit surface 82 as a reflected light beam 90. An optical characteristic of the retroreflector 75, which is created by the angular relationship of the reflective wall surfaces 84a-84c, is that the reflected light beam 90 always projects parallel to the incident light beam 88. This parallel relationship is maintained even if the light beam 88 does not impinge on the entry-exit surface 82 orthogonally. Unlike a mirror, the retroreflector 75 therefore reflects light back in a direction parallel to the incident light, regardless of the angle of incidence of the light beam 88 with respect to the entry-exit surface 82.

This parallel reflection quality causes the light beams in the beam arm segments 74b-74e and 76b-76e (FIG. 1) to remain parallel with respect to one another and maintain the substantially equal path lengths within the vacuum chamber 27 of the gradiometer 20 (FIG. 1). Fixing the position of the retroreflectors 70a-70d becomes less critical when assembling the gradiometer 20, because the retroreflectors create the parallelism in the light beams 26 and 28 even though the angular orientation of each retroreflector may not be precisely exact. A similar situation exists with the retroreflectors 72a-72d attached to the test masses 22, 23 and 24.

Conventional retroreflectors can also be of the open variety. An open retroreflector is constructed of mirrors or other high-grade reflective optical material oriented to form the reflective surfaces 84a, 84b and 84c. An open retroreflector can be used in place of each retroreflector described herein. An open retroreflector has the effect of not changing the speed of light as occurs when the light passes through the changed medium of the optical body of a closed retroreflector. Using open retroreflectors causes the speed of light to remain constant throughout the entire beam arms 32 and 34, because the light beams do not pass through an optical body, thereby avoiding any phase or path length differences that might be created by conducting the light beams through a different medium.

The parallel relationship of the beam arms 32 and 34 is established and maintained by the beam splitter 42, the beam combiner 44 and by the retroreflectors 70a-70d and 72a-72d. This parallel relationship assures that the beam arms 32 and 34 will not deviate from parallel to create unintended path length differences. Assembling and using the gradiometer 20 under these circumstances is considerably easier than the tedious and often changeable nature of attempting to establish and maintain an exact angle of a reflecting mirror within a conventional gravity measuring instrument.

The optical parallelism of the beam arms 32 and 34 within the gradiometer 20 makes it possible to establish an exact vertical orientation of the test masses 22 and 24 during use of the gradiometer 20. An exact vertical orientation of the test masses 22 and 24 is essential in establishing an accurate spatial derivative of gravity in the vertical direction, i.e. a vertical gradient of gravity. If the test masses 22 and 24 are not exactly vertically oriented, the gradient measurement will not be completely accurate.

Because the light beams 26 and 28 in the beam arms 32 and 34 are parallel to one another in the vacuum chamber 27, due to the use of the retroreflectors 70a-70d and 72a-72d, and because output light beam 46 is parallel to the light beams 26 and 28 in the beam arms 32 and 34 due to the effect of the parallel surface beam combiner 44, a vertical orientation of the test masses 22 and 24 can be established by evaluating the vertical orientation of the output light beam 46. When the output light beam 46 is vertically oriented, the test masses 22 and 24 will be vertically oriented, due to the parallelism of the beam arms 32 and 34. The position of the gradiometer 20 is adjusted to achieve a precise vertical alignment of the test masses 22 and 24 as determined by the vertical projection of the output light beam 46.

The verticality of the output light beam 46 is determined by disconnecting the optical fiber 48 (FIG. 1), and allowing the output light beam 46 to project upward from a window in the housing 80 of the gradiometer 22, as shown in FIG. 4. The output light beam 46 is then deflected through two precise 90° angles in such a manner that the downward deflected output light beam 46 projects downward exactly parallel to the direction which the output light beam 46 exits upward from the housing 80 of the gradiometer. The downward deflected output light beam 46 impinges on a surface 97 of a reflective liquid 98 contained within a container 99. The liquid 98 in the container 99 forms a well known liquid geopotential surface standard. The reflective surface 97 of the liquid 98 is precisely horizontal in the container 99, due to the uniform effect of gravity on the liquid 98. Of course, a typical meniscus effect is created where the liquid 98 adjoins the container 99 due to surface tension of the liquid. However, spaced away from the location of the meniscus, in the center of the liquid within the container, the reflective surface is precisely horizontal.

If the output light beam 46 impinging on the reflective surface 97 is exactly perpendicular to the horizontal reflective surface 97, the incident output light beam 46 will reflect exactly back on itself, as shown by solid lines 46 in FIG. 4. Under these conditions, the incident light beam 46 is exactly vertical, i.e. perpendicular to the exactly horizontal reflective surface 97. Because the output light beam 46 has been deflected through two precise 90° angles, the output light beam 46 impinging the reflective surface 97 is exactly parallel to the output light beam 46 exiting from the housing 80 of the gradiometer 20. This exact parallel relationship assures that the beam arms 32 and 34 within the vacuum chamber are also vertical, because the beam arms 32 and 34 extend parallel to the output light beam 46 exiting the housing 80.

On the other hand, if the output light beam 46 impinging on the reflective surface 97 is not exactly perpendicular to the horizontal reflective surface 97, the light beam reflected from the reflective surface 97 will not reflect back on itself, but instead will reflect at an angle relative to the incident beam angle. Such angular reflection is indicated by the exemplary dashed reflective light beams 101. Under these circumstances, the incident or impinging light beam is not exactly perpendicular to the horizontal reflective surface 97, thereby indicating that the output light beam 46 exiting the housing 80 is not vertical and the test masses 22 and 24 are not vertical. Under these conditions, the upright orientation of the gradiometer 20 is adjusted until the light beam reflects from the surface 97 directly back on the incident light beam 46 impinging on the reflective surface 97.

As an alternative which allows the optical fiber 48 to remain connected to the housing 80 of the gradiometer 20 and conduct the light beam 46 (FIG. 1), a separate vertical alignment beam 95 is emitted from the parallel surface beam combiner 44 and projected outward through its own separate permanent window 93 in the housing 80, as shown in FIG. 4. The vertical alignment beam 95 is thereafter used in the same manner as has been previously described with respect to the output light beam 46, to establish the exact vertical orientation of the test masses 22 and 24. Until the exact vertical orientation is established, the vertical alignment beam 95 will be reflected from the surface 97 in the manner indicated at 101.

The reflective coating on the parallel surface beam combiner 44 is adjusted to emit a small amount of light forming the vertical alignment beam 95. For example, the reflective coating may only be approximately 95% reflective and approximately 5% transmissive. Under such circumstances, a relatively weak but nevertheless sufficiently intense vertical alignment beam 95 will be transmitted from the beam combiner 44, for use in the manner described.

Figure 5:
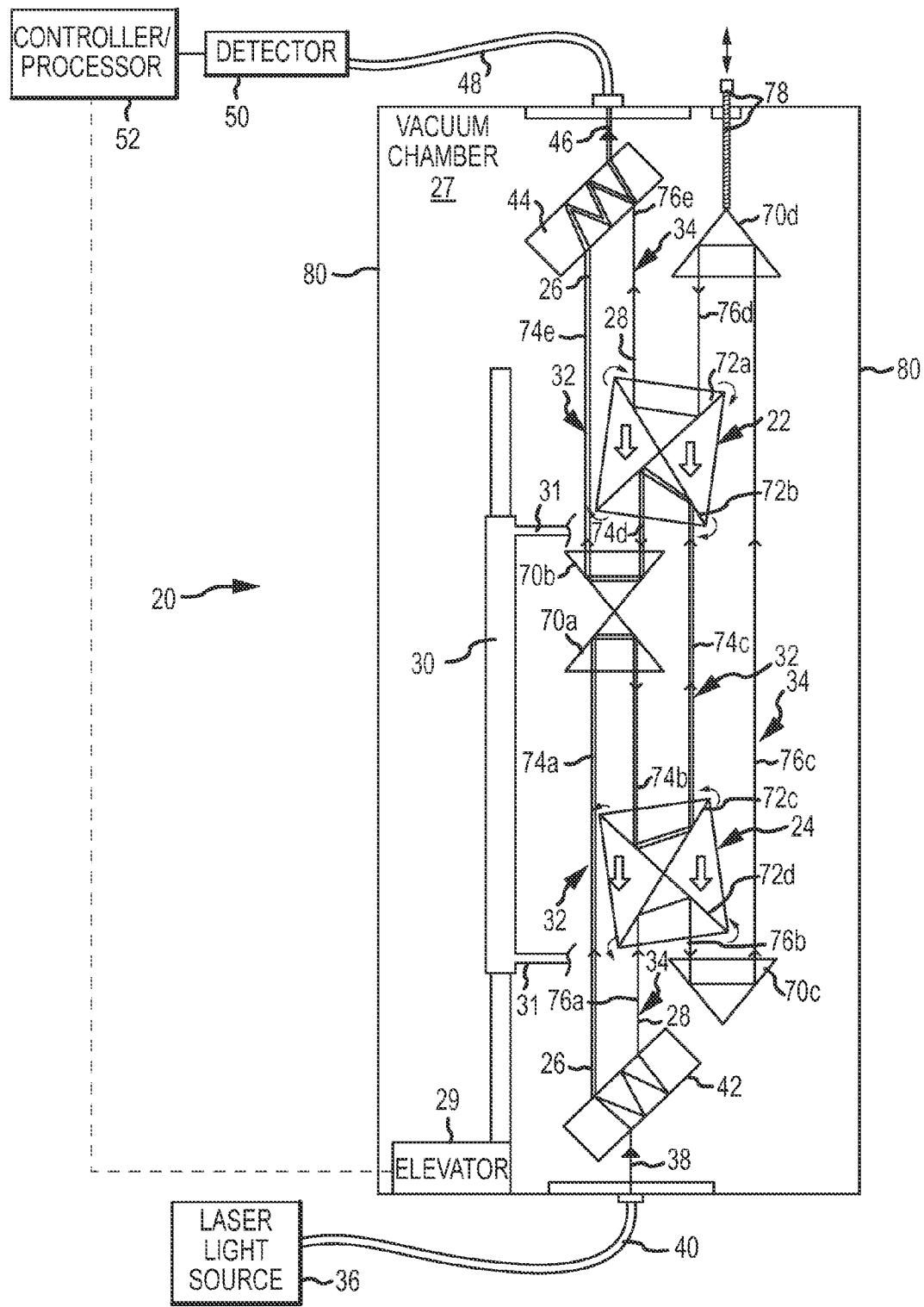
FIG. 5 is a diagram similar to FIG. 1, showing exaggerated inadvertent rotation of test masses during simultaneous freefall.

Using the retroreflectors 72a-72d on the test masses 22 and 24 also achieves advantageous improvements in avoiding the unintended spurious effects from unintended random rotation of the test masses 22 and 24 during freefall. Rotation of the test masses is illustrated in FIG. 5, where the upper test mass 22 is shown rotated clockwise and the lower test mass 24 is shown rotated counterclockwise. The test masses 22 and 24 are subject to random rotation while freefalling due to random perturbations or vibrations of the housing 80 at the instant(s) when the test masses 22 and 24 are released into freefall. Such random perturbations may rotate both test masses in the same or different directions, or rotate one test mass but not the other, or rotate one test mass to a different relative degree than the other test mass is rotated. Unintended random rotation of the test masses during freefall does not change the lengths of the beam arms 32 and 34, for the reasons discussed in connection with the exemplary retroreflector 75 shown in FIGS. 3A, 3B and 3C.

Figure 3B:
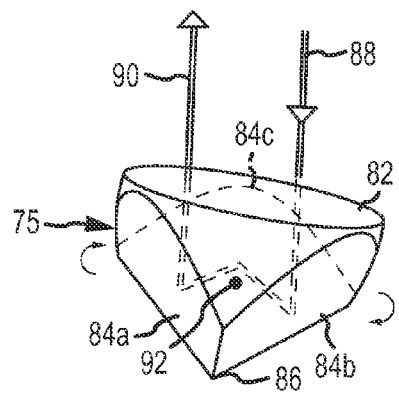
Figure 3C:
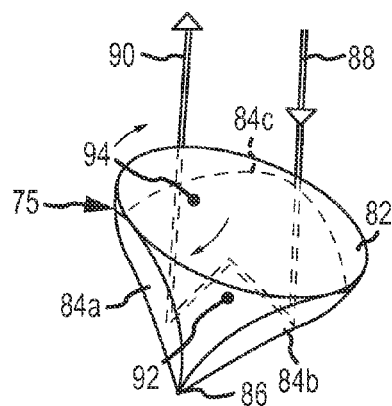

The retroreflector 75, shown in FIGS. 3A, 3B and 3C, has an optical center point 92 which is equidistant from each of the reflective wall surfaces 84a-84c. When the retroreflector 75 is rotated about the optical center point 92, the path length of the light beam from the point of incidence on the entry-exit surface 82 to the point of exit from the entry-exit surface 82 remains constant. Thus, when the retroreflector 75 is rotated about the center point 92, the path length within the retroreflector remains constant regardless of the angle of the incident light beam 88 relative to the entry-exit surface 82. FIG. 3B illustrates the situation where the retroreflector 75 has been rotated slightly around the optical center point 92, but the length of the light path within the retroreflector 75 remains the same as when the incident light beam 88 intersects the entry-exit surface 82 orthogonally (FIG. 3A).

When the retroreflector 75 is rotated about a point 94 which is not coincident with the optical center point 92, as shown in FIG. 3C, the length of the light path within the retroreflector 75 increases in length slightly, and that increase in length is related to the amount of angular rotation about the point 94 relative to the optical center point 92. For similar changes in angular rotation about points which have the same relative relationship to the optical center point 92, the increase in the length of the light path within the retroreflector 75 is the same.

Figure 6A:
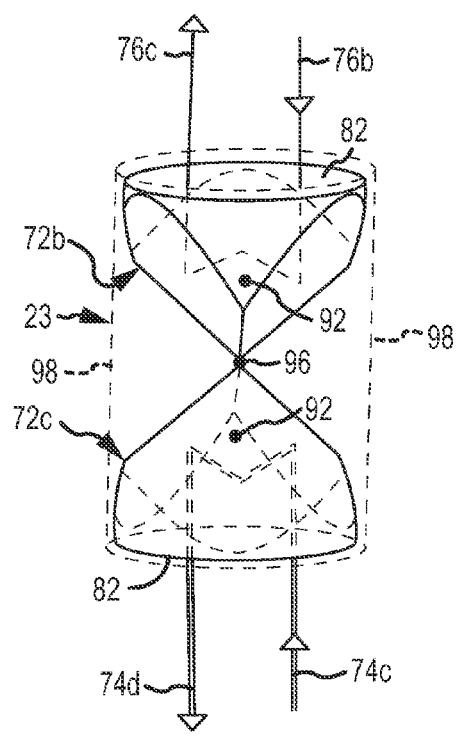
FIGS. 6A and 6B are perspective and schematic views of test masses of the type shown in FIGS. 1, 4 and 5 which include retroreflectors shown in FIGS. 3A-3C.
Figure 6B:
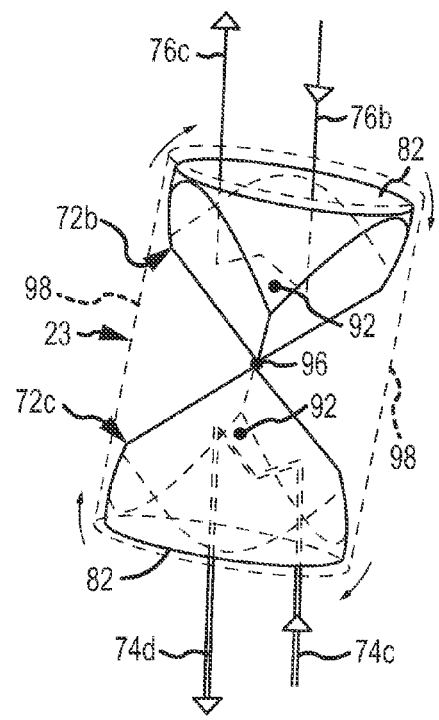

The above described properties of retroreflectors are used to advantage in constructing the test masses 22 and 24, as explained in conjunction with FIGS. 6A and 6B. The characteristics of the test mass 22 shown in FIGS. 6A and 6B apply equally to the test mass 24. The retroreflectors 72a and 72b are positioned on the test mass 22 with the entry-exit surfaces 82 facing in opposite directions and parallel with one another. The corners 86 of the retroreflectors 72a and 72b are adjacent to one another. The optical center points 92 of the retroreflectors 72a and 72b are located equidistant from a center of mass point 96 of the test mass 22. The two optical center points 92 and the center of mass point 96 are located collinearly. The corners 86 (FIGS. 3A-3C) are also located coincident with the collinear relationship of the two optical center points 92 and the center of mass 96. In this configuration, the distance from the center of mass point 96 to the optical center point 92 of the retroreflector 72a is equal to the distance from the center of mass point 96 to the optical center point 92 of the retroreflector 72b.

The test mass 22 has a physical structure 98 which holds the two retroreflectors 72a and 72b in place. The physical structure 98 of the test mass 22 and the two retroreflectors 72a and 72b are balanced so that the center of mass point 96 of the test mass 22 is located midway between the two optical center points 92. Such balancing may be achieved by moving adjustable weights (124, FIGS. 7 and 8) associated with the physical structure 98.

Locating the center of mass point 96 of the test mass 22 in the manner described causes the test mass 22 to rotate about the center of mass point 96 if the test mass 22 rotates while freefalling, as shown in FIG. 6B. Rotation about the center of mass point 96 causes the optical center points 92 of both retroreflectors 72a and 72b to rotate in the same amount and in the same direction relative to the center of mass point 96, as shown in FIG. 6B. This similar rotation in the same direction causes the parallel light beams which impinge on the retroreflectors 72a and 72b to be affected equally in their lengths. Consequently, rotation of the test mass 22 does not adversely affect the relative length of the beam arms 32 and 34, because such rotation has the same effect on the length of both beam arms 32 and 34. Since the beam arms 32 and 34 change length by the same amount when the test mass 22 rotates, the accuracy of measurement is not adversely affected.

If the test mass 22 rotates about any point other than the center of mass point 96, then the distances over which the respective light beams in the beam arms 32 and 34 travel will not be equal. However, when the test mass 22 is freefalling, it can rotate only about its center of mass point 96, so rotation of the test mass 22 about some point other than the center of mass point 96 is not possible during freefall.

FIG. 5 illustrates the situation where both of the test masses 22 and 24 rotate during freefall. If either one or both of the test masses 22 and 24 rotate during freefall, the lengths of both beam arms 32 and 34 change by the same amount, since the rotation of one or both test masses changes the length of both beam arms 32 and 34 by the same amount. Consequently the relative length relationship of the beam arms 32 and 34 is unaffected by rotation of the test masses during freefall. Since the lengths of the beam arms 32 and 34 change by the same amount when the test masses 22 and 24 rotate, common mode rejection of the adverse influences from rotation of the test masses 22 and 24 is achieved when the light beams from the beam arms are combined interferometrically. Rotation of the test masses 22 and 24 does not introduce aberrant interference fringes within the output light beam 46.

An example of the physical structure 98 shown in FIGS. 6A and 6B which holds the retroreflectors in position with their optical center points 92 equidistant from the center of mass point 96, is described below in conjunction with FIGS. 7 and 8 as a housing 100. This description is with reference to test mass 22, although the same description applies with respect to the other test mass 24.

Figure 7:
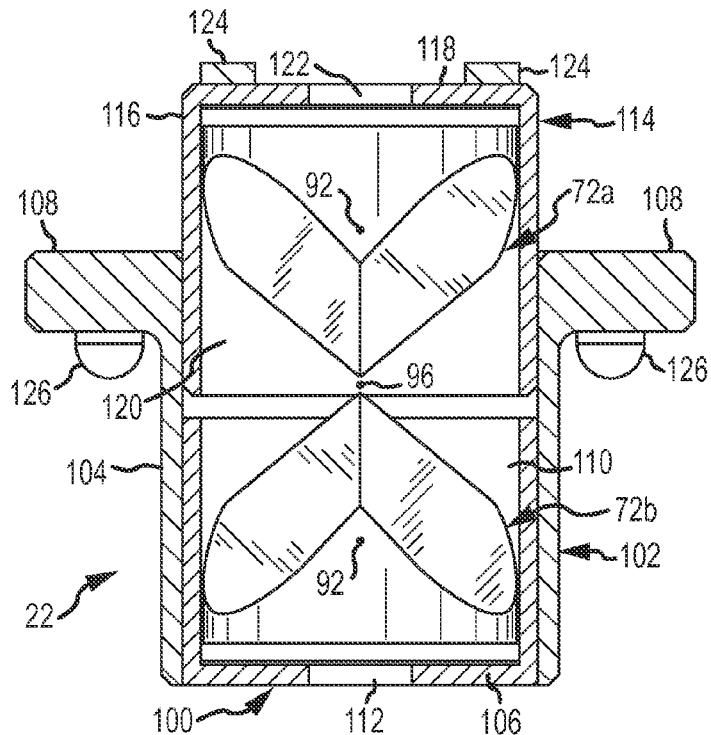
FIG. 7 is a partial sectional and side elevational view of the test mass shown schematically in FIGS. 6A and 6B.
Figure 8:
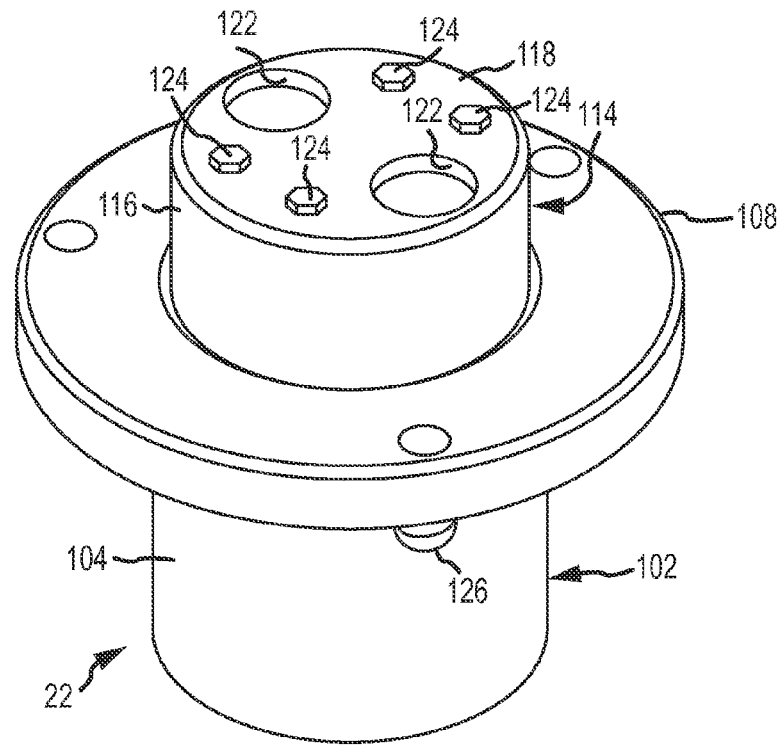
FIG. 8 is a perspective view of the test mass shown in FIG. 7.

As shown in FIGS. 7 and 8, a housing 100 of the test mass 22 includes a first cup portion 102 which is defined by a cylindrical side wall 104, a circular bottom wall 106 attached to the bottom (as shown) of the cylindrical side wall 104, and an annular flange 108 extending outward from the top (as shown) of the cylindrical side wall 104. The cylindrical side wall 104 and the circular bottom wall 106 define an interior 110 of the first cup portion 102. The retroreflector 72b is positioned within the interior 110 of the first cup portion 102 with the entry-exit surface 82 of the retroreflector 72b facing downward (as shown) at or near the bottom wall 106. The retroreflector 72b is fixed in position in the interior 110 of the cup portion 102 using conventional retention techniques. One or more light beam pass-through openings 112 are formed in the bottom wall 106 to allow the light beam 26 in the beam segments 74c and 74d of the beam arm 32 to impinge upon and reflect from the retroreflector 72b.

The housing 100 of the test mass 22 also includes a second cup portion 114 which is defined by a cylindrical sidewall 116 and a circular top wall 118 formed on the top (as shown) of the cylindrical sidewall 116. The cylindrical sidewall 116 and the top wall 118 define an interior 120 of the second cup portion 114. The retroreflector 72a is fixed in position within the interior 120 of the second cup portion 114, with the entry-exit surface 82 of the retroreflector 72a facing upward (as shown) at or near the top wall 118. The retroreflector 72a is fixed in position within the second cup portion 114 using conventional retention devices and techniques. At least one light beam pass-through opening 122 is formed in the top wall 118 to allow the light beams in the beam segments 76d and 76e of the beam arm 34 to impinge upon and reflect from the retroreflector 72a.

The outside diameter of the cylindrical sidewall 116 is preferably slightly smaller than the inside diameter of the cylindrical sidewall 104 to allow the bottom portion (as shown) of cylindrical sidewall 116 of the second cup portion 114 to be partially inserted into the interior 110 of the cylindrical sidewall 104 of the first cup portion 102. Threads (not shown) are formed at locations on the sidewall portions 104 and 116 to screw the two cup portions 104 and 116 firmly together as part of the housing 100.

The threaded engagement of the cylindrical side walls 104 and 116 also permits independent adjustment of the positions the optical center points 92 of each retroreflector 72a and 72b equidistantly relative to the center of mass point 96 (FIGS. 6A and 7) of the test mass 22. Balancing weights 124 are attached to the top wall 118 of the second cup portion 114. The balancing weights 124 are adjustable in position and/or removable and replaceable with different weights to make the center of mass point 96 of the test mass 22 exactly midway between the optical center points 92 of the retroreflectors 72a and 72b and to assure that the center of mass point 96 is also collinear with the optical center points 92, as discussed in connection with FIGS. 6A and 6B.

The collinear relationship of the optical center points 92 and the center of mass point 96 (FIG. 6A) is perpendicular to the plane in which the flange 108 extends from the cylindrical sidewall 104 of the first cup portion 102. The test mass 22 is supported from the support device 31 of the elevator frame 30 (FIG. 1) by contact feet 126 which are connected to the flange 108. Rapid downward movement of the elevator frame 30 and the support device 31 by the elevator 29 (FIG. 1) separates the contact feet 126 from the support device 31 and releases the test mass 22 for freefall. Preferably the contact feet 126 support the test mass with the collinear relationship of the optical center points 92 and the center of mass point 96 extending vertically. When the support device 31 (FIG. 1) withdraws to initiate freefall of the test mass 22, the perpendicular relationship of the collinear points 92 and 96 with the support device 31 releases the test mass into freefall without significantly rotating the test mass from the vertical orientation of the optical center points 92 and the center of mass point 96. Similarly, slowing the downward movement of the elevator frame 30 and the support device 31 by the elevator 29 (FIG. 1) reestablishes contact of the contact feet 126 with the support device 31 to catch the test mass 22 after it has freely fallen.

Figure 9:
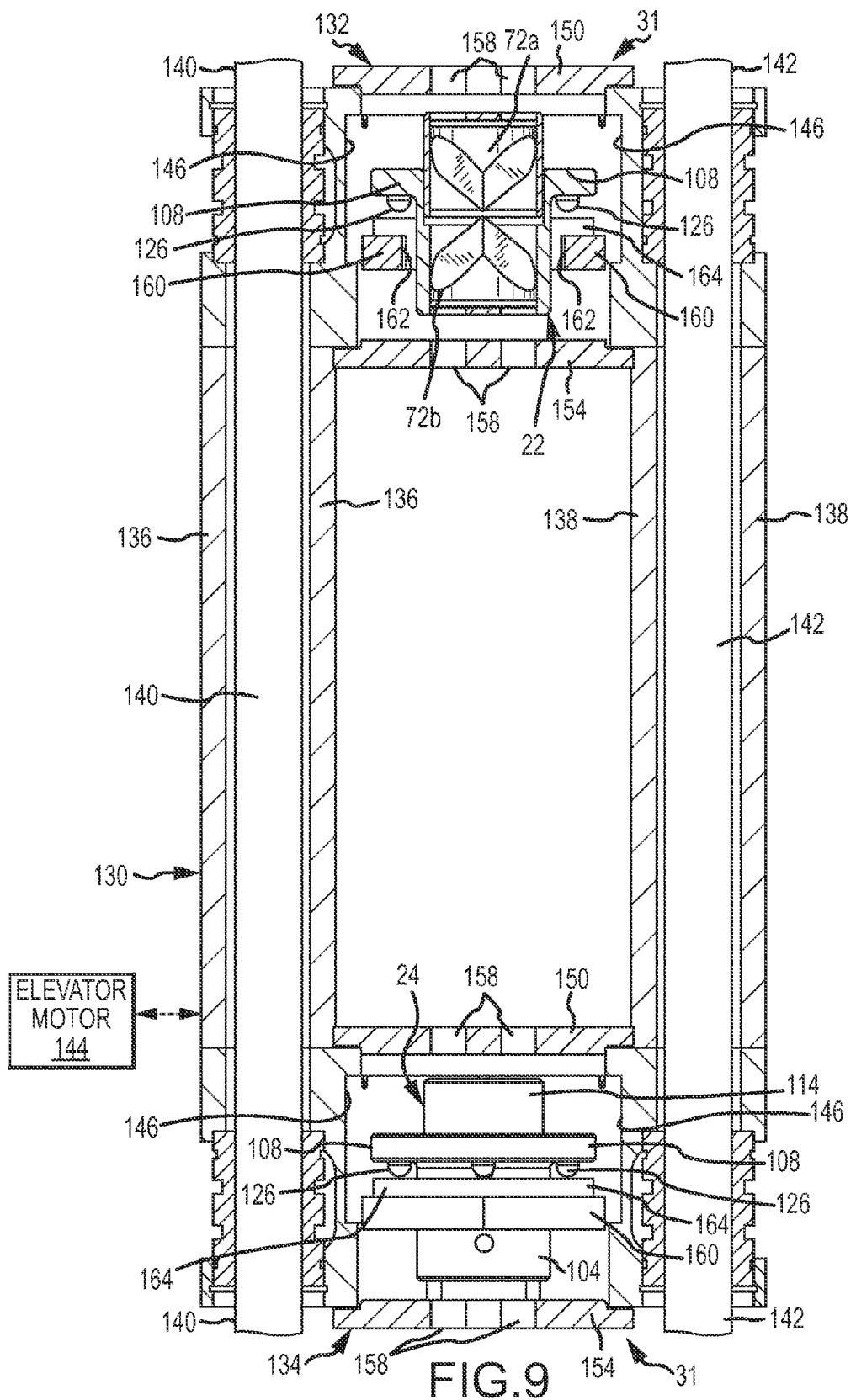
FIG. 9 is a partial sectional and side elevational view of an elevator frame of the gradiometer shown in FIGS. 1, 4 and 5.
Figure 10:
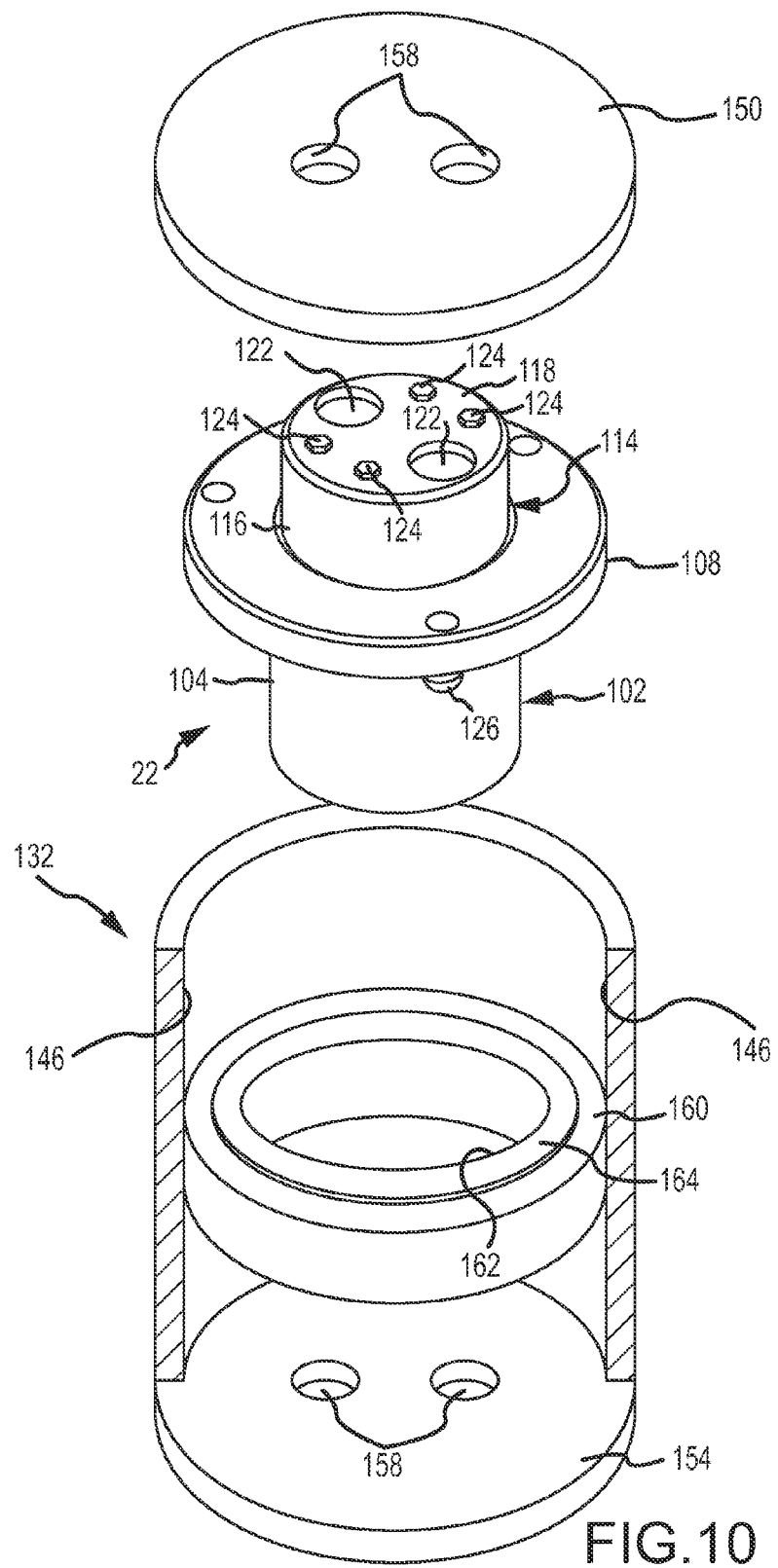
FIG. 10 is an exploded perspective view of a confinement chamber of the elevator frame and a test mass within the confinement chamber, shown in FIG. 9.

More details of the elevator frame 30 and the support devices 31 (FIG. 1) are shown and discussed in conjunction with FIGS. 9 and 10. The elevator frame 30 includes a frame structure 130 which includes upper and lower containment chambers 132 and 134 within which the test masses 22 and 24 are located and confined, respectively. The containment chambers 132 and 134 generally constitute the support devices 31 (FIG. 1) for the test masses.

The upper containment chamber 132 is positioned above the lower containment chamber 134 and is rigidly connected to the lower containment chamber 134 by a pair of support tubes 136 and 138, as shown in FIG. 9. The support tubes 136 and 138 are positioned around and slide along poles 140 and 142, respectively. The poles 140 and 142 extend generally parallel within the vacuum chamber 27 and are connected to the housing 80. An elevator motor 144 is connected by a conventional linkage (not shown) to move the frame structure 130 vertically along the poles 140 and 142. The elevator motor 144 is controlled by the controller/processor 52 (FIG. 1) to vary the movement characteristics (acceleration, velocity and position) of the frame structure 130. The elevator 29 and motor 144 are vibration-isolated from the housing 80 of the differential gradiometer 20 (FIG. 1).

Each of the upper and lower containment chambers 132 and 134 is defined by a cylindrical sidewall 146, a roof plate 150 attached on top (as shown) of the sidewall 146, and a floor plate 154 attached on the bottom (as shown) of the sidewall 146. The roof plate 150 of each containment chamber 132 and 134 is removable and replaceable to allow the test masses 22 and 24 to be inserted in the containment chambers 132 and 134.

Each roof plate 150 and each floor plate 154 includes at least one light beam pass-through opening 158 which allows the light beams in the segments 74b, 74c, 74d, 76a, 76b, 76d and 76e of the beam arms 32 and 34 (FIG. 1) to pass into the containment chambers and through the pass-through openings 112 and 122 in the bottom and top walls 106 and 118 of the test masses 22, 23 and 24 (FIGS. 7, and 8) to interact with the retroreflectors of the test masses 22 and 24. The frame structure 130 is constructed to avoid interfering with the light beams 26 and 28 of the beam arms 32 and 34 (FIG. 1).

A flange 160 extends inward from the sidewall 146 into each containment chamber 132 and 134, and an annular opening 162 extends through the flange 160. An annular sleeve 164 is inserted in the annular opening 162. The flange 160 and the annular sleeve 164 form a test mass support ring which supports each test mass 22 and 24 within each containment chamber 132 and 134. The annular opening 162 and the contact support sleeve 164 receive the cylindrical sidewall 104 of the first or lower cup shaped portion 102 of the housing 100 (FIGS. 7 and 8) of the test mass in each containment chamber 132 and 134. The downward-facing (as shown) contact feet 126 on the flange 108 (FIGS. 7 and 8) of each test mass 22 and 24 contact and rest upon the contact support sleeve 164 when the test mass is not falling freely. Sufficient clearance exists between the outside surface of the cylindrical sidewall 104 (FIGS. 7 and 8) and the annular opening in the contact support sleeve 164 to avoid contacting and thereby restricting the movement of the test mass during freefall.

To release the test masses 22 and 24 to fall freely, the elevator motor 144 moves the frame structure 130 downward at an acceleration rate which is greater than the acceleration of gravity. The greater acceleration rate causes the test mass support rings formed by each flange 160 and support sleeve 164 to move downward away from the contact feet 126 on the flange 108 of each test mass (FIGS. 7 and 8), thereby suspending each test mass 22 and 24 for downward movement solely under the influence of gravity. The downward acceleration rate of the frame structure 130 caused by the elevator motor 144 is not so great as to cause the roof plates 150 to come in contact with the upper cup portions 114 (FIGS. 7 and 8) of each test mass, because such contact would accelerate each test mass in an artificial manner and prevent it from falling freely solely under the influence of gravity. After the test masses have been released to fall freely in the manner described, the elevator motor 144 controls the acceleration and velocity of the frame structure 130 to allow the test masses 22 and 24 to remain suspended without contact with the support sleeve 164 in each containment chamber 132 and 134 during the entire course of simultaneous freefall. Once a sufficient length of freefall of the test masses has occurred, the elevator motor 144 retards the acceleration of the frame structure 130 to allow the contact feet 126 of the test masses 22 and 24 to regain contact with the support sleeves 164, thereby catching the test masses from their freefall, and again supporting the test masses from the test mass support rings.

Thereafter, the elevator motor 144 raises the frame structure 130 in readiness to again release the test masses for freefall.

The elevator frame structure 130 is shown in FIG. 10 has a single structure with the containment chambers 132 and 134 connected rigidly together by the support tubes 136 and 138. Alternatively, each containment chamber 132 and 134 could be moved along the poles 140 and 142 by its own separate frame structure and elevator motor. However, using separate motors and separate elevator frame structures 130 increases the complexity of the gradiometer 20, both from the structural and operational standpoints.

When the test masses 22 and 24 are released simultaneously to freefall, the distance between the two test masses 22 and 24 will increase very slightly due only to the slightly greater gravity affecting the lower test mass 24 compared to the slightly lesser gravity affecting the upper test mass 22. The very slight increase in distance between the two freely falling test masses 22 and 24 is difficult to detect, even with the above-described four times amplification effect of the beam arms 32 and 34. The change in distance between the two freely falling test masses 22 and 24 might be so slight that less than one interference fringe 60 (FIG. 2) would be generated. Attempting an accurate measurement from only one interference fringe 60 is difficult using conventional statistical fitting interferometry techniques.

One way to increase the number of interference fringes is to allow the test masses to fall freely for a substantial distance, thereby allowing the separation difference between the two test masses to increase to the point where more optical fringes are generated. This solution might be somewhat impractical for a commercial embodiment of the gradiometer, because a relatively lengthy freefall distance cannot be conveniently accommodated by the size of the device and the movement range of the elevator.

Another way to increase the number of interference fringes is by imparting a finite velocity to one of the test masses compared to the other test mass at the commencement of simultaneous freefall. Imparting an initial finite velocity to one of the test masses at the instant that the other test mass is released for freefall has the effect of changing the lengths of the beam arms 32 and 34 more than they would otherwise change if the two pairs of test masses were released simultaneously for freefall solely only under the influence of gravity. The initial finite velocity of one test mass compared to the other test mass causes the separation distance to increase to a greater extent than the change created by the difference in gravity alone acting on the test masses 22 and 24, despite the fact that both test masses fall freely solely under the influence of gravity. The greater change in relative length of the beam arms 32 and 34 creates more interference fringes. A reasonable increase in the number of interference fringes enhances the fitted statistical recognition of those interference fringes and the ability to distinguish those interference fringes from spurious background noise.

The elevator 29, elevator frame 30 and support devices 31 may be used to impart an initial finite downward velocity to one of the test masses at the instant that the other test mass is released for freefall. The initial relative velocity difference may be imparted by using separate elevators 29, elevator frame 30 and support devices 31 (FIG. 1) to release the test masses at different times. The first-released test mass has a finite velocity caused by the acceleration from gravity at the time that the second test mass is released to fall freely.

Even though the elevator frame structure 130 rigidly connects the containment chambers 132 and 134 for simultaneous movement by the elevator motor 144 (FIG. 9), an initial velocity may be imparted to one of the test masses by releasing one of the test masses for freefall prior to release of the other test mass, or by momentarily artificially accelerating one of the test masses while allowing natural gravity to accelerate the other test mass at the commencement of simultaneous freefall. To accomplish this, the support sleeves 164 (FIGS. 9 and 10) are formed of materials which have respectively different resiliency characteristics. A support sleeve 164 having a relatively flexible or resilient characteristic will deflect under the weight of the test mass when at rest, but a support sleeve 164 having a more rigid configuration will not. As the elevator frame structure 130 is accelerated downward, the test mass resting on the more rigid support sleeve 164 is released into freefall almost immediately and begins to accelerate solely under the influence of gravity. However, the other test mass resting on the relatively more flexible support sleeve 164 stays at rest for a finite amount of time as the more flexible support sleeve 164 rebounds. Only when the support sleeve 164 has fully rebounded to its original unsupporting or unloaded shape will the test mass begin to accelerate in freefall solely under the influence of gravity. Because gravity acts to accelerate the test mass from the time that it is released to fall freely, the first-released test mass will have accelerated to an initial velocity greater than zero at the time when the other test mass is released to fall freely. The first-released test mass will therefore have a finite initial velocity greater than the zero velocity of the later-released test mass when it begins falling freely. The result of this time delay and the local acceleration of gravity is that a velocity difference is established between the two test masses.

Figure 11A:
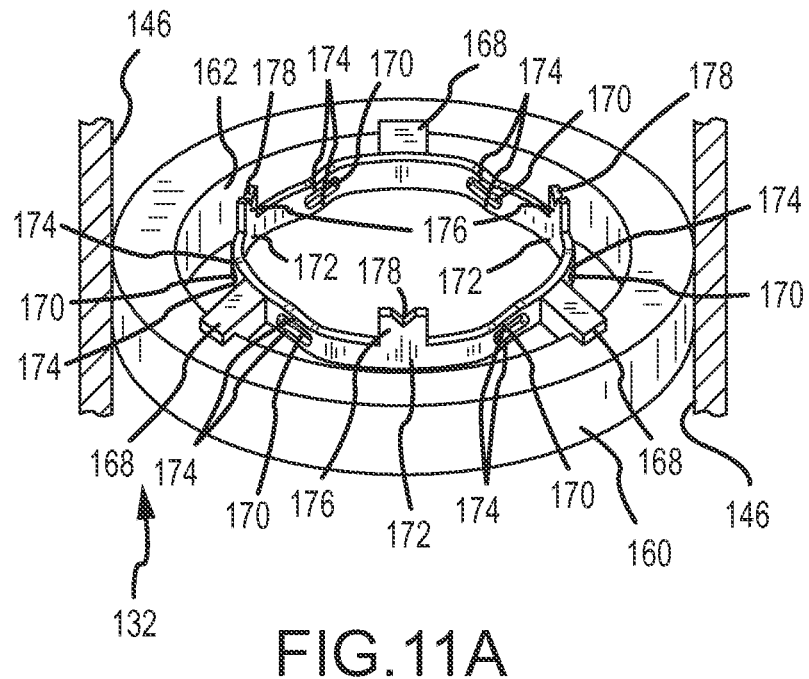
FIG. 11A is perspective view of a support sleeve shown in FIGS. 9 and 10, depicted resiliently deflected.
Figure 11B:
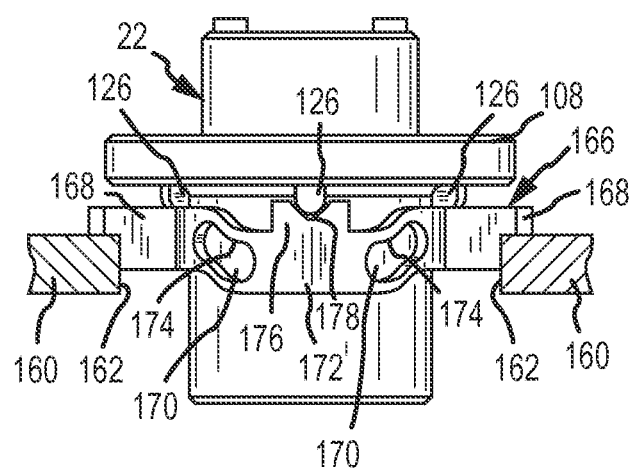
FIG. 11B is a side elevation view of the support sleeve shown in FIG. 11A with a test mass resting on the support sleeve and causing the deflection.

A structural embodiment 166 of the support sleeve which creates enough flexibility to impart a relative velocity difference between the test masses is shown in FIGS. 11A and 11B. The support sleeve 166 fits within the annular opening 162 of the flange 160 (FIGS. 9 and 10) of the containment chamber 132, in a manner similar to that previously described with respect to the support sleeve 164 (FIGS. 9 and 10). Projections 168 extend radially outward from the support sleeve 166 to contact the flange 160, thereby holding the support sleeve 166 in position in the annular opening 162 relative to the flange 160.

The support sleeve 166 is generally of a cylindrical configuration, and is preferably formed from a metal such as aluminum. A plurality of openings 170 are formed radially completely through the support sleeve 166 to separate solid segments 172 of the sleeve 166 by relatively narrow bands 174 of material. Each projection 168 is located between two openings 170, and two openings are located at opposite ends of each solid segment 172. The projections 168 extend outward from the support sleeve 166 between adjacent openings 170. Foot rests 176 extend upward from the center of each solid segment 172. Each foot rest 176 includes a notch 178 which is adapted to receive one contact foot 126 extending from the flange 108 of the test mass 22. The notches 178 of the foot rests 176 are located at the same circumferential positions where the contact feet 126 are located around the flange 108 of the test mass 22.

When the test mass 22 rests on the support sleeve 166 as shown in FIG. 11B, the weight of the test mass 22 causes the narrow bands 174 of material to deflect downward. The solid segments 172 are therefore displaced downward relative to the portions of the support sleeve 166 from which the projections 168 extend. The weight of the test mass 22 is not so great as to permanently deform the narrow bands 174 downward, but instead the amount of deflection in is within the elastic range of deflection of the material forming the support sleeve 66. The downward deflection of the narrow bands 174 causes those bands 174 to act as a resilient spring.

When the elevator frame structure 130 is accelerated downward, the test mass 22 remains supported on the foot rests 176 while the narrow bands 174 begin rebounding from the downward flexed position and move the solid segments 172 upwardly while the test mass 22 remains supported from the foot rests 176. The downward acceleration of the frame structure 130 increases until the narrow bands 174 are no longer deflected downwardly, and at that point the test mass 22 is released for freefall solely under the influence of gravity. In this manner, the spring characteristics of narrow bands 174 delay the time when the test mass 22 is released for freefall. Under certain circumstances, the downward deflection of the narrow bands 174 may cause them to rebound slightly into an upper deflection, in which case the narrow bands 174 may impart an slight, momentary artificial upward acceleration to the test mass 24 which causes an even greater time delay before the test mass commences freefall solely under the influence of gravity. Of course, the effect of delaying the commencement of freefall solely under the influence of gravity allows the other test mass to achieve a finite velocity before the delayed test mass commences downward freefall solely under the influence of gravity. The increased separation distance between the two test masses results in an increased the number of fringes generated, and the increased number of fringes facilitates fitted statistical detection of the vertical gradient of gravity.

Figure 12:
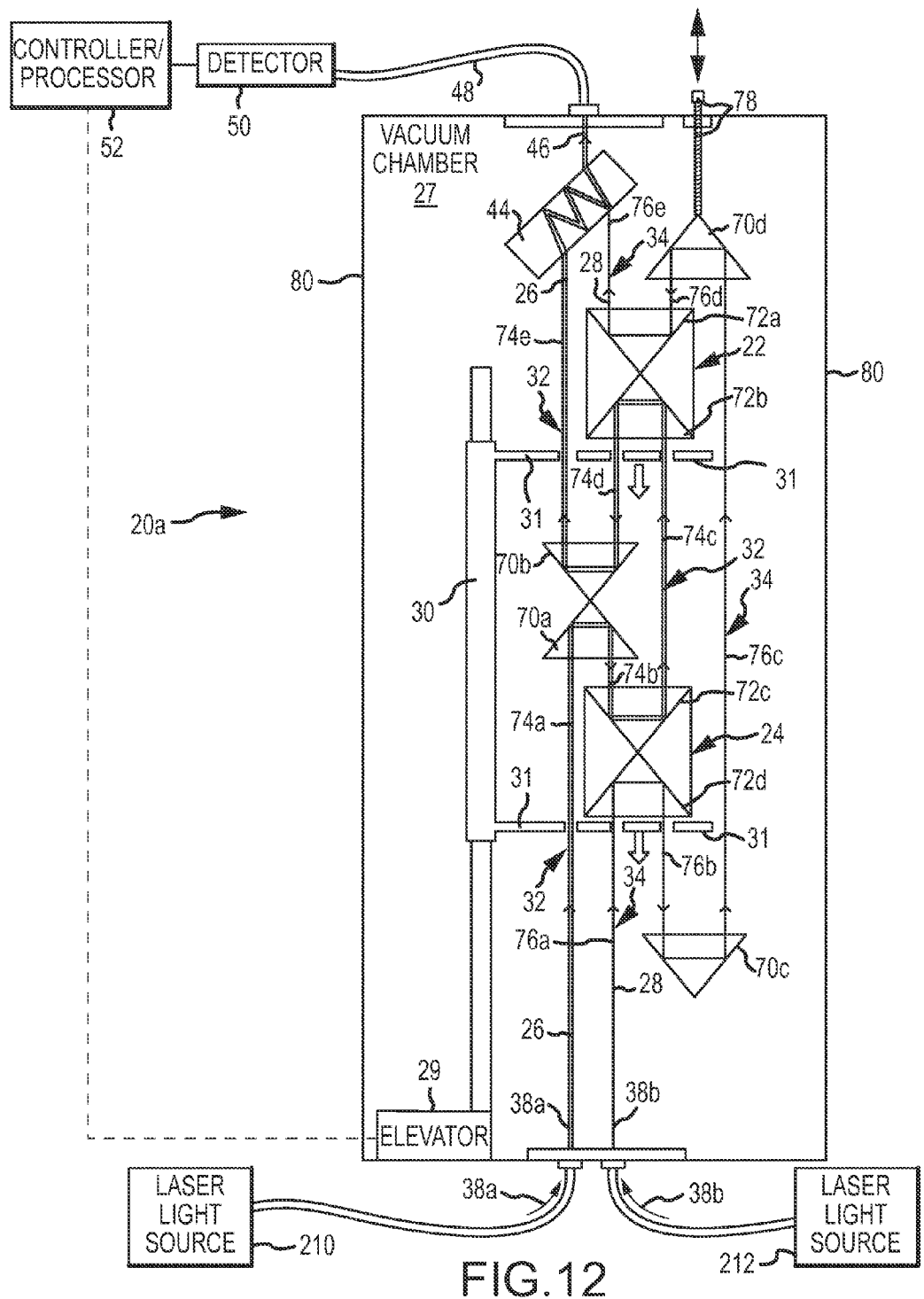
FIG. 12 is a generalized block and schematic diagram of another optical interferometric gradiometer which also embodies the present invention.

Another technique to generate numerous fringes is to employ two different-frequency input light beams 38a and 38b from two different constant-frequency light sources, such as the laser light sources 210 and 212, in a gradiometer 20a shown in FIG. 12. The laser light sources 210 and 212 emit light beams 38a and 38b having respectively different constant frequencies. The input light beam 38a from the light source 210 is conducted through an optical fiber 214, where the light beam 38a enters the vacuum chamber 27 and becomes the light beam 26 in the first beam arm 32. The input light beam 38b from the light source 212 is conducted through an optical fiber 216, where the light beam 38b enters the vacuum chamber 27 and becomes the light beam 28 in the second beam arm 34. Because the laser sources 210 and 212 create the separate light beams 38a and 38b which have respectively different frequencies, the beam splitter 42 (FIG. 1) is not used in the embodiment 20a of the gradiometer shown in FIG. 12.

The respectively different frequencies of the light beams 26 (38a) and 28 (38b) in the two beam arms 32 and 34 will inherently create fringes 60 (FIG. 2) at a frequency given by the frequency difference of the two laser sources. The Doppler shift of each light beam adds to each light beam as it does in the single laser source description above. The difference in laser source frequencies provides a carrier frequency on which the Doppler shifted frequency signal rides when the light beams 26 and 28 are combined. When the light beams 26 and 28 in the beam arms 32 and 34 reflect from the simultaneously freefalling test masses 22 and 24, the resulting interference fringes will be a modification of the normal interference fringes that result from a pure combination of the light beams 26 (38a) and 28 (38b) uninfluenced by the effect of the freely falling test masses 22 and 24. The modification of the pattern of fringes represents the gradient of gravity. However, using two separate different-frequency light sources will not achieve the common mode rejection of phase differences and optical fiber path changes in the input light beams 38a and 38b, which is possible by using a single light source 36 and single optical cable 40 to conduct a single input light beam to the vacuum chamber 27 (FIG. 1).

The embodiments of the gradiometers 20 and 20a described in connection with FIGS. 1 and 12 illustrate the test masses 22 and 24 vertically separated from one another. Separating the test masses 22 and 24 vertically is required for measuring a vertical gradient of gravity. However, a change in vertical gravity between horizontally spaced positions can be determined by the embodiment 20b of the gradiometer shown in FIG. 13.

Figure 13:
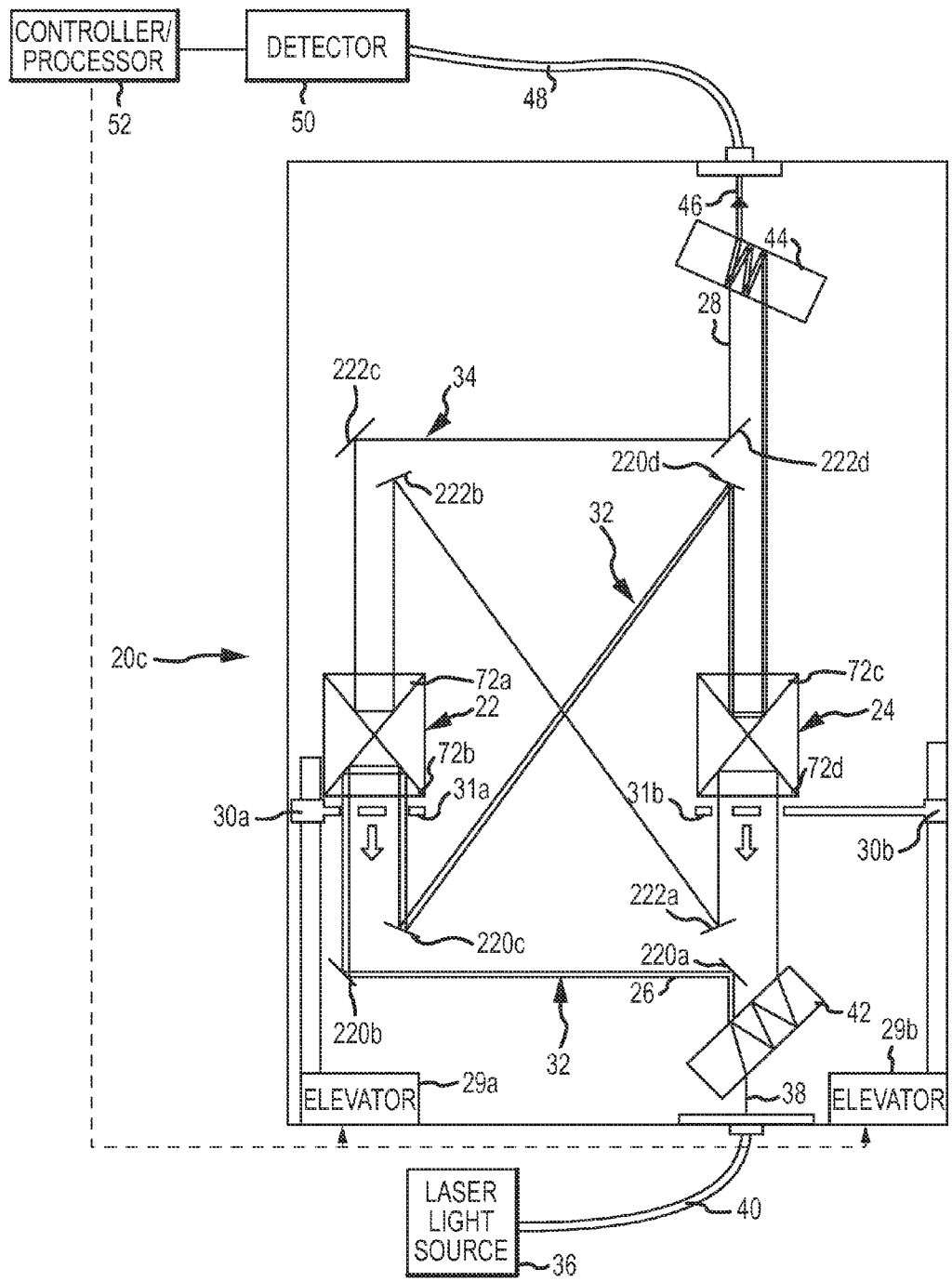
FIG. 13 is a generalized block and schematic diagram of another optical interferometric gradiometer which also embodies the present invention, used to measure a change in vertical gravity in a horizontal direction.

In the gradiometer 20b shown in FIG. 13, the test masses 22 and 24 are separated by a predetermined horizontal distance. The gradient is directly established by the change in vertical gravity over the horizontal distance between the test masses 22 and 24. Many of the advantageous features of the previously described embodiments of the gradiometers 20 and 20a are attained in the gradiometer 20b, except the inherent parallelism in the light beams 26 and 28 by use of the retroreflectors and beam splitters and combiners.

To create the beam arm 32, the retroreflectors 70a and 70b (FIG. 1) are replaced by mirrors 220a, 220b, 220c and 220d. To create the beam arm 34, the retroreflectors 70c and 70d (FIG. 1) are replaced by mirrors 222a, 222b, 222c and 222d. The use of the mirrors 220a-220d and 222a-222d makes it more difficult to adjust and control the path of the light beams 26 and 28 in the beam arms 32 and 34 to achieve the equal lengths, because more adjustments are required and because each of the mirrors presents an opportunity to drift from its adjusted position due to mechanical tolerances and temperature and pressure differences. Equal path lengths can be achieved nonetheless, using the multiple frequency input light beam technique described herein.

Separate elevators 29a and 29b, elevator frames 30a and 30b, and support devices 31a and 31b are used in the gradiometer 20b, depending upon the extent of horizontal separation of the test masses 22 and 24. If the extent of horizontal separation is relatively small so that a single relatively wide test mass support device 31 may be used, a single elevator may be employed in the gradiometer 20b. In such a case, the single elevator positions the test mass support devices 31 to obtain the desired degree of horizontal separation.

Various aspects of the process flow involved in measuring the vertical gradient of gravity and the use of the gradiometers described above are illustrated in FIGS. 14-16. In connection with describing these process flows, reference is made to certain aspects of the components previously described in connection with FIGS. 1-13.

Figure 14:
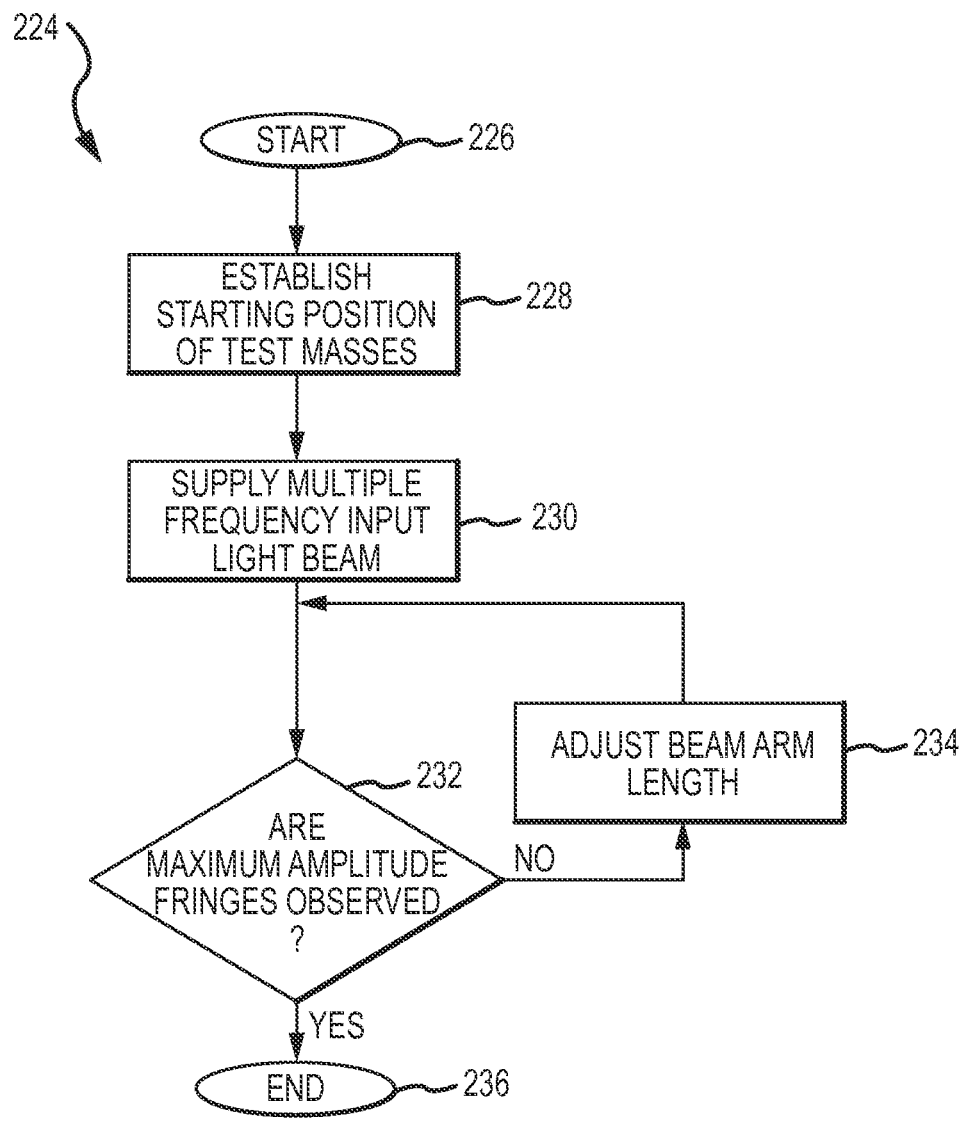
FIG. 14 is a flow chart of a process flow employed in adjusting beam arms to equal path lengths in the gradiometer shown in FIGS. 1, 12 and 13.

An exemplary process flow 224 for establishing equal length of the beam arms 32 and 34 is illustrated in FIG. 14. The process flow 224 begins at 226. Then, each elevator 29, elevator frame 30 and support device 31 (FIG. 1) is moved to a starting position, as indicated at 228. The starting position may be the uppermost position, or some other position within the range of simultaneous freefall movement of both test masses. At 230, a multiple frequency input light beam 38 is supplied from an input light source, such as a band limited mercury lamp. The different wavelengths in the light will create interference fringes due to the interferometric interaction of the different wavelengths. When the beam arms 32 and 34 are not of the same length, the interference fringes will be of moderate or low intensity because the different frequencies in the light beams 26 and 28 constructively interfere at different points and thus tend to cancel or wash each other out. However, when the beam arms 32 and 34 are adjusted to the nearly same length, the different wavelengths will constructively add at nearly the same locations, creating a sharp maximum amplitude when the lengths of the beam arms 32 and 34 are at zero path length difference or equal to one another.

The output signal 46 is then detected by the detector 50 and processed by the controller/processor 52 (FIG. 1) to identify fringes 60 (FIG. 2). The maximum amplitude of the fringes is noted at 232. Thereafter, the length of a beam arm is adjusted at 234. Adjustment of the beam arm 34 is accomplished by use of the micrometer screw 78 (FIG. 1). The adjustment of the length of the beam arm at 234 will have an effect on the amplitude of the fringes, and that effect is noted at 232. Adjustment of the beam arm length continues in this manner until fringes achieve a maximum amplitude as determined by an affirmative determination at 232. A maximum amplitude of the fringes determined at 232 indicates that the beam arms 32 and 34 (FIG. 1) are equal in length, at which point the process flow 224 ends at 236.

Figure 15:
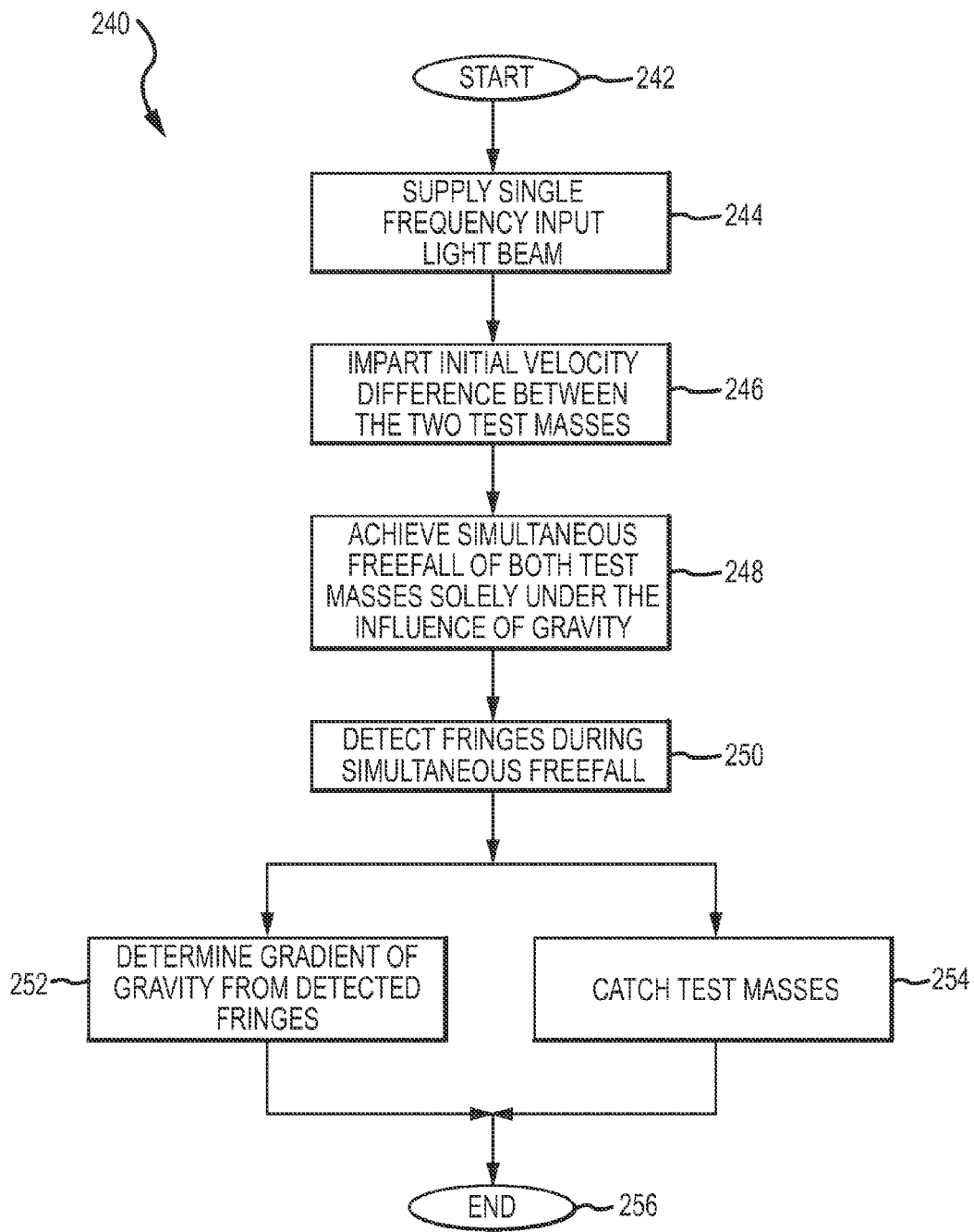
FIG. 15 is a flow chart of a process flow employed in obtaining a gradient of gravity measurement using the gradiometer shown in FIG. 1.

An exemplary process flow 240 for determining the gradient of gravity using a single constant-frequency input light beam is illustrated in FIG. 15. The process flow 240 begins at 242. At 244, a single frequency input light beam 38 is supplied from a single laser or other constant-frequency light source 36 (FIG. 1). At 246, an initial velocity difference between the two test masses is imparted, preferably using the technique described above. Both test masses are allowed to freefall simultaneously solely under the influence of gravity at 248, after the initial velocity difference has been imparted. The output signal 46 containing the interference fringes is detected by the detector 50 and processed by the controller/processor 52 (FIG. 1) at 250, to directly determine the gradient of gravity from the detected fringes at 252. The interference fringes processed at 250 were obtained while the test masses were in simultaneous freefall solely under the influence of gravity. Either simultaneously with or before or after determining the gravity gradient at 252, the elevator 29, the elevator frame 30 and the support devices 31 are operated to catch the test masses and thereby stop their freefall, at 254. Thereafter, the process flow 240 ends at 256. The process flow 240 is thereafter repeated with each subsequent determination of the gradient of gravity.

Figure 16:
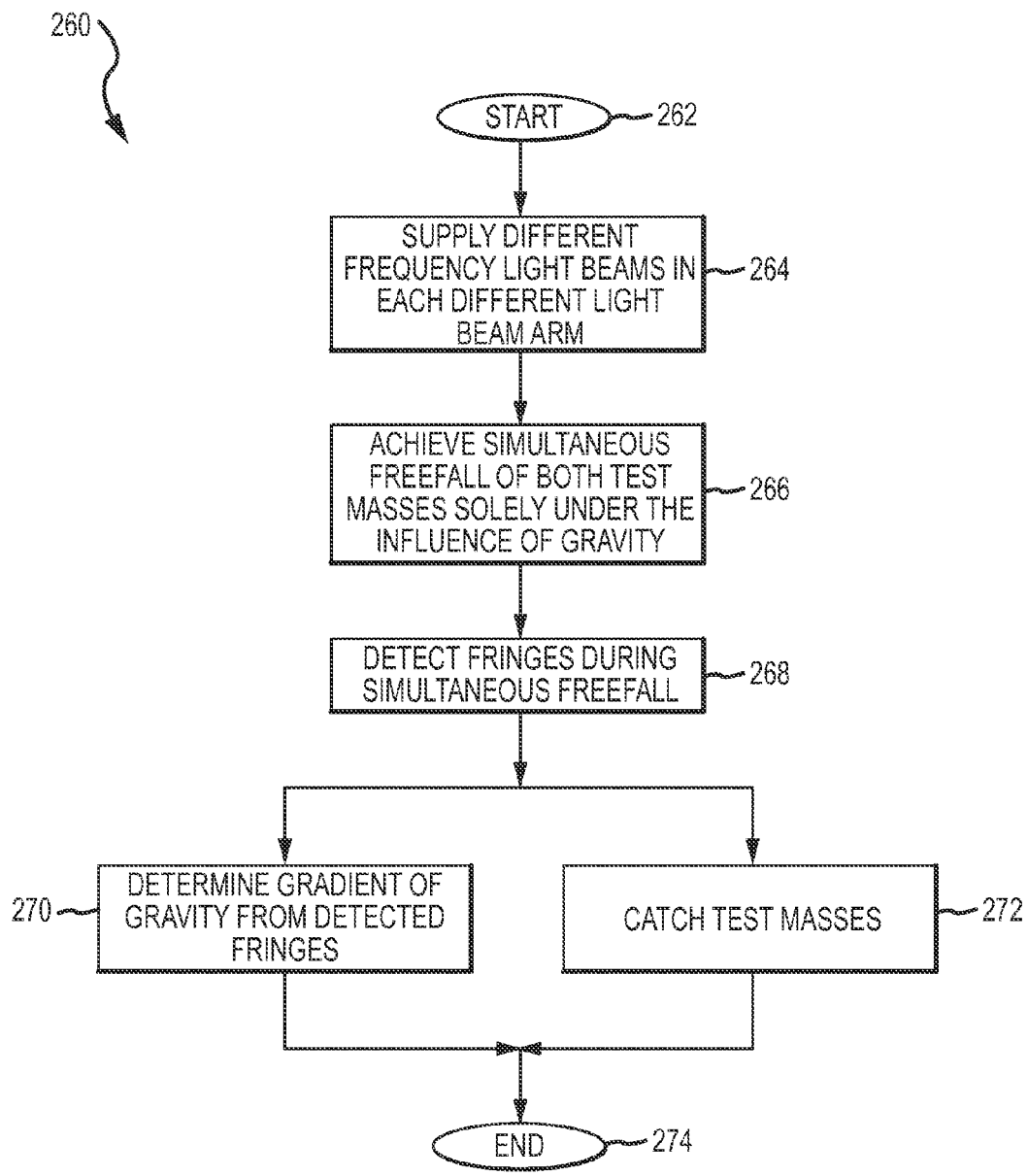
FIG. 16 is a flow chart of a process flow employed in obtaining a gradient of gravity measurement using the gradiometer shown in FIG. 12.

An exemplary process flow 260 for determining the gradient of gravity using two different-frequency, constant-frequency input light beams 38a and 38b (FIG. 13) is illustrated in FIG. 16. The process flow 260 begins at 262. The two different-frequency input light beams 38a and 38b are supplied from their respectively different laser or constant-frequency light sources 210 and 212 (FIG. 13) at 264. The test masses achieve simultaneous freefall solely under the influence of gravity at 266, such as by simultaneously releasing the test masses with or without imparting an initial velocity difference to the test masses. The output signal 46 containing the interference fringes is thereafter detected by the detector 50 and processed by the controller/processor 52 (FIG. 1) at 268, to directly determine the gradient of gravity at 270. The interference fringes which were processed at 268 were obtained while the test masses were in simultaneous freefall solely under the influence of gravity. Either simultaneously with or before or after determining the gravity gradient at 270, the elevator 29, elevator frame 30 and the support devices 31 are operated to catch the test masses and thereby stop their simultaneous freefall, at 272. Thereafter, the process flow 260 ends at 274. The process flow 260 is thereafter repeated with each subsequent determination of a gradient of gravity.

One of the benefits of the present invention is that the gradient of gravity is determined and made available very quickly after the termination of the simultaneous freefall of the test masses. The interference fringe characteristics define the gradient of gravity directly, and thereby avoid the necessity to measure two gravity values, subtract those values from one another, and then divide the difference by the separation distance to obtain the gradient of gravity. The interference fringe characteristics in the output light beam 46 directly define the gradient of gravity, thereby achieving an immediate value of the gradient of gravity.

Figure 17:
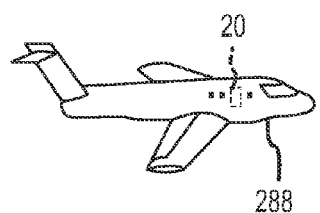
FIG. 17 is an illustration of an aircraft carrying a gradiometer and flying close to a surface of the earth which contains a mineral deposit and a tunnel.
Figure 17:
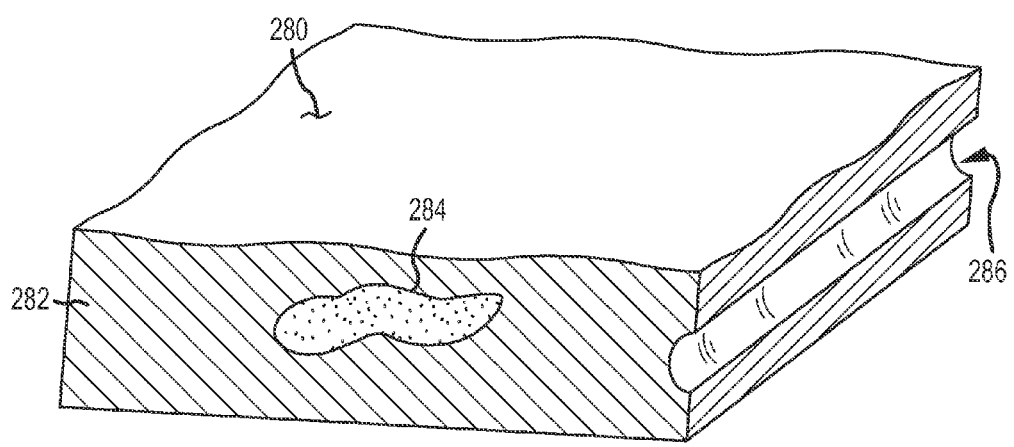

Gradient of gravity information is especially useful for detecting subterranean anomolies near the surface 280 of the earth 282, as illustrated in FIG. 17. Such anomalies are generally exemplified by a mineral deposit 284, such as a diamond tube or cobalt seam, or an underground tunnel 286. The near-surface mass density of the earth 282 is changed by the presence of the mineral deposit 284 or the tunnel 286, and that changed mass density is reflected by a change in gravity. The gradiometer detects the change in gravity created by such subterranean anomalies, and thereby helps in identifying such anomalies.

Figure 18A:
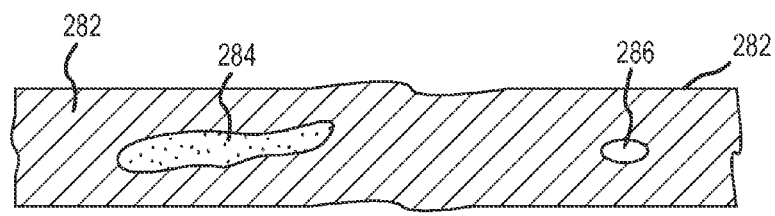
FIG. 18A is a representation of the near-surface subterranean mass abnormalities shown in FIG. 17.
Figure 18B:
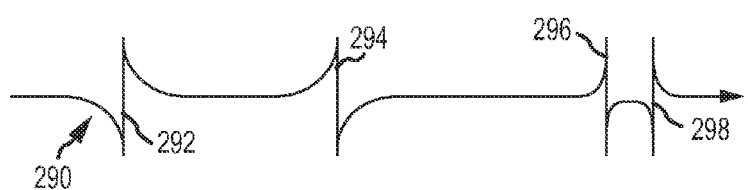
FIG. 18B is a generalized graph of a gradient of gravity caused by the subterranean abnormalities shown in FIG. 18A.

The gradiometers described herein may be moved across the surface 280 of the earth 284 in an airplane 288 (FIG. 17) or other vehicle. As the airplane 288 moves above and across the surface 280 of the earth, the gradiometer passes over the subterranean anomalies 284 and 286, as understood from FIG. 18A. An output signal 290 (FIG. 18B) representing the gravity gradient is created directly from the interference fringe information, as the gradiometer passes from left to right (as shown) over the anomalies 284 and 286. The output signal 290 illustrates a momentarily increased gravity gradient at 292 caused by the transition encountered when moving (left to right as shown) over the higher density mineral deposit 284. The end of the mineral deposit 284 (on the right as shown) causes a momentary decrease in the gravity gradient at 294. In a similar manner, passing over the tunnel 286 (moving left to right as shown) causes a momentary decrease in the gravity gradient due to the void and lesser mass of the tunnel, followed by a momentary increase in the gravity gradient due to the side of tunnel ending in the earth. The momentary transition from lower to higher gravity gradient is shown in the signal 290 at 296 and 298. Between the fluctuations 292, 294 and 296, 298, the gravity gradient signal 290 remains relatively constant because the near-field mass density does not change in these areas.

The advantageous common mode rejection characteristics of the gradiometer allows it to be employed successfully and accurately in a vibration-prone environment such as in the airplane 288 (FIG. 17) or in other moving vehicles, such as automobiles, ships, submarines and spacecraft. The common mode rejection characteristics of the gradiometer reduce or eliminate the effects of vibration related noise. Creation of the increased number of interference fringes, caused by the enhanced amplification factor resulting from reflecting both light beams 26 and 28 from both test masses 22 and 24 (FIG. 1), and caused by imparting an initial relative velocity difference on the two freefalling test masses as described above, also assists in creating sufficient interference fringes to determine the gravity characteristic accurately and to distinguish those interference fringes 60 (FIG. 2) from background noise.

Many significant improvements result from the present invention, as previously discussed and reiterated below. The high level of effective common mode rejection cancels or ameliorates most external noise influences. The common mode rejection results in substantial part because beam arms 32 and 34 (FIG. 1) remain equal in length throughout the combined freefall of the test masses 22 and 24 (FIG. 1), except for the effects of any gravity gradient and any initial relative velocity difference imparted to the test masses. The effects of any initial velocity difference are readily recognized and eliminated, leaving the gradient of gravity as the remaining characteristic which is effectively measured. The adverse influences of unintended perturbations and noise equally affects both equal length beam arms 32 and 34, allowing those adverse influences to be completely rejected or canceled when determining the gradient of gravity measured from the interference fringes.

Balancing the test masses 22 and 24 with their centers of mass relative to the optical center points of their retroreflectors preserves the relative length relationship of the beam arms 32 and 34, despite rotation of the test masses that might occur during freefall. Rotation of the upper and lower test masses 22 and 24 does not change the optical path of both beam arms 32 and 34. The rotation of the test masses during freefall no longer constitutes an additional source of anomalous interference fringes which adversely influence the measurement of the gravity gradient.

The equal length characteristics of the beam arms 32 and 34 are facilitated by the use of the parallel path optical elements 44, 46, 70a-70d and 72a-72d (FIG. 1) which prevent the beam arms 32 or 34 from deviating from the parallel relationship with one another and thereby preserve the equality in length. Use of the parallel path optical elements in the gradiometer also greatly facilitates its assembly and construction and avoids the difficulties associated with aligning and maintaining mirrors and other noninherent-parallel path optical elements, which may deviate the light beams from their intended paths due to handling during use and other environmental considerations.

The amplification factor of four, which is achieved by reflecting both light beams in both beam arms 32 and 34 from both test masses 22 and 24, represents a significant improvement in resolution. The practical benefit is that the test masses do not require as much distance to freefall to achieve adequate resolution, compared to the freefall distance required with a lower amplification factor. A gradiometer with the higher amplification factor of four can be made smaller and more compact than a gradiometer having a lower amplification factor.

Common mode rejection is also achieved in the input light beam 38 and the output light beam 46. Any frequency and phase shifts from the single laser light source 36 are present equally in the light beams 26 and 28 conducted in the beam arms 32 and 34, since the light beams 26 and 28 are derived from the single input light beam 38 (FIG. 1) which is transmitted through a single optical fiber 40. As a result, any frequency and phase variations in the single input light beam 38 are present equally in the light beams 26 and 28 in the beam arms 32 and 34, and are therefore canceled by common mode rejection when the light beams 26 and 28 are combined in the single output light beam 46. Common mode rejection of laser frequency or phase changes or movements of the input optical fiber 40 or input light beam splitter 42 is obtained by the substantially equal path lengths in the two beam arms 32 and 34 so that these disturbances travel through both beam arms 32 and 34 at the same time over the same path length and cancel when the beams 26 and 28 are recombined at the beam combiner 44 as the output light beam 46 of the gradiometer 20. A similar common mode rejection occurs with respect to phase differences introduced by movement or vibration of the optical fiber 48 which conducts the output light beam 46 to the detector 50.

Imparting an initial relative velocity difference to the two freely falling test masses facilitates the creation of more interference fringes which are useful in improving the measurement of the gradient of gravity. The common mode rejection capability permits the initial relative velocity difference to be imparted to the test masses in such a way as not to introduce anomalies arising from imparting the initial relative velocity difference.

Many other advantages and improvements will become apparent upon fully appreciating the many aspects of the present invention. Presently preferred embodiments of the present invention and many of its improvements have been described with a degree of particularity. This description is preferred examples of implementing the invention, and is not necessarily intended to limit the scope of the invention. The scope of the invention is defined by the scope of the following claims.

What is claimed:

1. A gradiometer for measuring a gradient of gravity between two predetermined separated locations by interferometry of first and second light beams, comprising:

first and second test masses which are released for simultaneous freefall solely under respectively different influences of gravity on each test mass at a different one of the two separated locations; and an arrangement of optical elements which directs the first and second light beams into first and second separate and different beam arms respectively, the first beam arm directing the first light beam to impinge upon and reflect from both test masses during the simultaneous freefall of both test masses, the second beam arm directing the second light beam to impinge upon and reflect from both test masses during the simultaneous freefall of both test masses, and wherein an interferometric combination of the first and second light beams delivered from the first and second beam arms after impingement upon and reflection from the test masses contains interferometric information which directly defines the gradient of gravity.

2. A gradiometer as defined in claim 1, wherein:

the arrangement of optical elements combines the first and second light beams delivered from the first and second beam arms into an output light beam, the output light beam containing the interferometric information which directly defines the gradient of gravity.

3. A gradiometer as defined in claim 2, further comprising:

a detector responsive to the output light beam and operative to supply a measurement signal representing the interferometric information contained in the output light beam; and a processor responsive to the measurement signal and operative to deliver information describing the gradient of gravity represented by the interferometric information.

4. A gradiometer as defined in claim 1, wherein:

each beam arm has an optical path length which the light beam in that beam arm traverses; and the arrangement of optical elements creates equal and opposite changes in the respective optical path lengths of the first and second beam arms arising from simultaneous freefall of the first and second test masses.

5. A gradiometer as defined in claim 1, wherein:

each beam arm has an optical path length which the light beam in that beam arm traverses;

the arrangement of optical elements establishes equality in the optical path lengths of the first and second beam arms at one point in the simultaneous freefall of the first and second test masses; and the arrangement of optical elements permits the respectively different influences of gravity on the first and second test masses during simultaneous freefall to deviate the optical path lengths of the first and second beam arms from the equality.

6. A gradiometer as defined in claim 1, wherein:
each beam arm has an optical path length which the light beam in that beam arm traverses;
the arrangement of optical elements includes at least one optical path length adjusting element in one beam arm; and further comprising:
an adjustment device connected to the optical path length adjusting element to adjust the optical path length of the one beam arm to equal the optical path length of the other beam arm at one point in the simultaneous freefall of the test masses.

7. A gradiometer as defined in claim 1, further comprising:
a single vacuum chamber in which both the first and second test masses freefall.

8. A gradiometer as defined in claim 1, wherein:
the first and second beam arms extend in parallel relation with one another.

9. A gradiometer as defined in claim 8, wherein:
the first and second test masses freefall in paths which are collinear or parallel to one another and which are parallel to the first and second beam arms.

10. A gradiometer as defined in claim 1, further comprising:
a source of a constant-frequency input light beam; and wherein the arrangement of optical elements includes:
a beam splitter which receives the input light beam and optically splits the input light beam into the first and second light beams and directs the first and second light beams in the first and second beam arms; and
a beam combiner which receives the first and second light beams from the first and second beam arms after each light beam has impinged upon and reflected from the test masses and which combines the first and second light beams from the first and second beam arms into a single output light beam which contains the interferometric information that directly defines the gradient of gravity.

11. A gradiometer as defined in claim 1, wherein:
each test mass has a first surface oriented in the same direction of freefall and a second surface oriented in the opposite direction of freefall;
the first light beam in the first beam arm impinges upon and reflects from the first surface of one test mass and the second surface of the other test mass; and
the second light beam in the second beam arm impinges upon and reflects from the second surface of the one test mass and the first surface of the other test mass.

12. A gradiometer as defined in claim 1, further comprising:
a first support device operative to support the first test mass and to release the first test mass for freefall;
a second support device operative to support the second test mass and to release the second test mass for freefall; and wherein:
one of the first or second support devices includes a resilient element which establishes an initial finite freefall velocity of the one test mass when the other test mass commences simultaneous freefall.

13. A method of measuring a gradient of gravity between two predetermined separated locations, comprising:
freefalling a first test mass solely under one influence of gravity at one of the separated locations;
freefalling a second test mass solely under another respectively different influence of gravity at the other one of the separated locations;
simultaneously freefalling the second test mass during at least a portion of the time when the first test mass is freefalling;
directing a first light beam in a first beam arm to impinge upon and reflect from both first and second test masses during the simultaneous freefall of both test masses;
directing a second light beam in a second beam arm to impinge upon and reflect from both first and second test masses during the simultaneous freefall of both test masses, the second beam arm being separate and different from the first beam arm;
combining the first and second light beams from the first and second beam arms after the first and second light beams have impinged upon and reflected from both test masses during the simultaneous freefall of the test masses to create interferometric information; and
directly determining the gradient of gravity from the interferometric information of the combined first and second light beams.

14. A method as defined in claim 13, wherein each beam arm has an optical path length which the light beam in that beam arm traverses, and further comprising:
equally changing in the respective optical path lengths of the first and second beam arms arising from the respectively different influences of gravity on the first and second test masses during simultaneous freefall of the test masses.

15. A method as defined in claim 14, further comprising:
increasing the optical path length of one beam arm during simultaneous freefall of the test masses; and
decreasing the optical path length of the other beam arm during simultaneous freefall of the test masses.

16. A method as defined in claim 13, wherein each beam arm has an optical path length which the light beam in that beam arm traverses, and further comprising:
establishing equality in the optical path lengths of the two beam arms at one point during the simultaneous freefall of the test masses.

17. A method as defined in claim 13, further comprising:
establishing an initial relative velocity difference of the first and second test masses at the instant of commencement of simultaneous freefall of the first and second test masses.

18. A method as defined in claim 13, wherein each beam arm has an optical path length which the light beam in that beam arm traverses, and further comprising:
equally changing the optical path lengths of the first and second beam arms arising from any rotation of either test mass during freefall.

19. A method as defined in claim 13, further comprising:
freefalling the first and second test masses in paths which are collinear or parallel to one another; and
orienting the first and second beam arms parallel to one another and to the paths in which the test masses freefall.

20. A method as defined in claim 13, further comprising:
freefalling the first and second test masses in paths which are collinear or parallel to one another;
directing the combined first and second light beams parallel to the paths in which the test masses freefall; and
using the combined first and second light beams to orient the first and second test masses to freefall vertically.

21. An instrument for detecting a characteristic of gravity from first and second light beams, comprising:
first and second test masses which are released for simultaneous freefall solely under respectively different influences of gravity in movement paths which are parallel to one another;
an arrangement of optical elements which directs the first and second light beams into respectively separate and different first and second beam arms;

the first beam arm directing the first light beam to impinge upon and reflect from both test masses during the simultaneous freefall of the test masses;

the second beam arm directing the second light beam to impinge upon and reflect from both test masses during the simultaneous freefall of the test masses; and wherein:

first and second beam arms are parallel to one another and are parallel to the parallel movement paths of the first and second test masses; and the characteristic of gravity is directly detected from interferometric information contained in a combination of the first and second light beams delivered from the first and second beam arms after both light beams have impinged upon and reflected from both test masses during simultaneous freefall of the test masses.

22. An instrument as defined in claim 21, wherein:
each test mass includes at least one surface upon which each light beam impinges upon and reflects from; and
each surface of each test mass reflects the light beam parallel to the impinging light beam.

23. An instrument as defined in claim 21, wherein:
each test mass has a first surface oriented in the direction of freefall of the test masses and a second surface oriented in the opposite direction of freefall of the test masses;
the first light beam in the first beam arm impinges upon and reflects from the first surface of one test mass and the second surface of the other test mass; and
the second light beam in the second beam arm impinges upon and reflects from the second surface of the one test mass and the first surface of the other test mass.

24. An instrument as defined in claim 23, wherein:
each surface reflects each light beam parallel to each impinging light beam.

25. An instrument as defined in claim 23, wherein:
each surface of each test mass comprises a retroreflector.

26. An instrument as defined in claim 25, wherein:
each test mass has a center of mass;
each retroreflector has an optical center point; and
the retroreflectors are located on each test mass with the optical center points of the retroreflectors separated at finite equal distances from the center of mass and with the optical center points and the center of mass collinear with one another.

27. An instrument as defined in claim 21, wherein:
each test mass includes a surface upon which each light beam impinges upon and reflects from;
each of the first and second beam arms is formed by a plurality of beam arm segments;
the light beams in the beam arm segments either impinge upon or reflect from the surfaces of the first and second test masses; and
the beam arm segments of the first and second beam arms are parallel with one another and to the movement paths of the test masses during simultaneous freefall.

28. An instrument as defined in claim 21, wherein:
the first and second light beams respectively supplied to the first and second beam arms are derived from a single input light beam;
the first and second light beams from the first and second beam arms are combined into a single output light beam after the first and second light beams have impinged upon and reflected from the first and second test masses in the first and second beam arms during simultaneous freefall of the test masses; and
the first and second light beams are parallel to one another from the derivation of the first and second light beams from the single input light beam until the combination of the first and second light beams into the single output light beam.

29. An instrument as defined in claim 21, wherein:
each beam arm has an optical path length which the light beam in that beam arm traverses; and
the arrangement of optical elements creates opposite changes in the respective optical path lengths of the first and second beam arms arising from simultaneous freefall of the first and second test masses.

30. An instrument as defined in claim 21, wherein:
the instrument is a gravimeter; and
the characteristic of gravity is a gradient of gravity.

31. An instrument as defined in claim 21, wherein:
the movement paths of the first and second test masses are collinear.

32. A method of detecting a characteristic of gravity, comprising:
simultaneously freefalling first and second test masses solely under respectively different influences of gravity in parallel movement paths;
respectively directing first and second light beams in first and second beam arms, the first and second beam arms are respectively separate and different from one another;
impinging the first light beam upon and reflecting the first light beam from both test masses during simultaneous freefall of the test masses;
impinging the second light beam upon and reflecting the second light beam from both test masses during simultaneous freefall of the test masses;
directing the first and second beam arms parallel to one another and to the parallel movement paths of the test masses during simultaneous freefall; and
combining the first and second light beams delivered from the first and second light beams after each light beam has impinged upon and reflected from both test masses during simultaneous freefall of the test masses; and
directly determining the characteristic of gravity from interferometric information contained in the combination of the first and second light beams.

33. A method as defined in claim 32, further comprising:
orienting a first surface of each test mass in the direction of freefall of the test masses;
orienting a second surface of each test mass in the opposite direction of freefall of the test masses;
directing the first light beam in the first beam arm to impinge upon and reflect from the first surface of one test mass and the second surface of the other test mass; and
directing the second light beam in the second beam arm to impinge upon and reflect from the second surface of the one test mass and the first surface of the other test mass.

34. A method as defined in claim 33, further comprising:
reflecting the light beam from each surface of each test mass parallel to the light beam which impinges on that surface.

35. A method as defined in claim 34, further comprising:
using a retroreflector as each surface of each test mass, each retroreflector having an optical center point;
establishing a center of mass of each test mass;
locating the retroreflectors on each test mass with the optical center points of the retroreflectors separated at finite equal distances from the center of mass of each test mass; and
locating the optical center points and the center of mass of each test mass collinearly with one another in each test mass.

36. A method as defined in claim 32, further comprising:
impinging each light beam on a surface of each test mass and reflecting each impinging light beam from that surface of each test mass;
forming each of the first and second beam arms by a plurality of beam arm segments;
directing the light beams in the beam arm segments to either impinge upon or reflect from the surfaces of the first and second test masses;
orienting the beam arm segments parallel to one another and to the movement paths of the test masses during simultaneous freefall.

37. A method as defined in claim 32, further comprising:
deriving the first and second light beams respectively supplied to the first and second beam arms from a single input light beam;
combining the first and second light beams from the first and second beam arms into a single output light beam after the first and second light beams have impinged upon and reflected from the first and second test masses in the first and second beam arms during simultaneous freefall of the test masses; and
directing the first and second light beams parallel to one another and to the movement paths of the test masses beginning from the derivation of the first and second light beams from the single input light beam until the combination of the first and second light beams into the single output light beam.

38. A method as defined in claim 32, wherein each beam arm has an optical path length which the light beam in that beam arm traverses, and further comprising:
increasing an optical path length of one beam arm and decreasing an optical path length of the other beam arm during simultaneous freefall.

39. A method as defined in claim 32, further comprising:
detecting a gradient of gravity as the characteristic of gravity.

40. A method as defined in claim 33, further comprising:
simultaneously freefalling the first and second test masses in collinear movement paths.

41. An instrument for detecting a characteristic of gravity from first and second light beams, comprising:
first and second test masses which are released for simultaneous freefall solely under respectively different influences of gravity in movement paths which are parallel to one another;
an arrangement of optical elements which directs the first and second light beams into respectively separate and different first and second beam arms;
the first beam arm directing the first light beam to impinge upon and reflect from both test masses during the simultaneous freefall of the test masses;
the second beam arm directing the second light beam to impinge upon and reflect from both test masses during the simultaneous freefall of the test masses; and wherein:
each beam arm has an optical path length which the light beam in that beam arm traverses when impinging upon and reflecting from both test masses;
the optical path lengths of the first and second beam arms are equal during simultaneous freefall of the test masses except for a deviation in the optical path lengths of the first and second light beams arising from the respectively different influences of gravity on each test mass during simultaneous freefall of the test masses and except for any deviation arising from any respective difference in relative velocities of the test masses upon commencement of the simultaneous freefall of the test masses; and
the characteristic of gravity is directly detected by interferometric information contained in a combination of the first and second light beams delivered from the first and second beam arms after both light beams have impinged upon and reflected from both test masses during simultaneous freefall of the test masses.

42. An instrument as defined in claim 41, wherein:
the deviation in the optical path length of one beam arm is opposite of the deviation in the optical path length of the other beam arm.

43. An instrument as defined in claim 41, wherein:
the deviation in the optical path length of one beam arm is equal to the deviation in the optical path length of the other beam arm.

44. An instrument as defined in claim 41, wherein:
the deviation in the optical path length of one beam arm is equal to and opposite of the deviation in the optical path length of the other beam arm.

45. An instrument as defined in claim 41, wherein:
each test mass has a first surface oriented in the direction of freefall of the test masses and a second surface oriented in the opposite direction of freefall of the test masses;
the first light beam in the first beam arm impinges upon and reflects from the first surface of one test mass and the second surface of the other test mass; and
the second light beam in the second beam arm impinges upon and reflects from the second surface of the one test mass and the first surface of the other test mass.

46. An instrument as defined in claim 45, wherein:
each surface reflects each light beam parallel to each impinging light beam.

47. An instrument as defined in claim 45, wherein:
each surface of each test mass comprises a retroreflector.

48. An instrument as defined in claim 47, wherein:
each test mass has a center of mass;
each retroreflector has an optical center point; and
the retroreflectors are located on each test mass with the optical center points of the retroreflectors separated at finite equal distances from the center of mass and with the optical center points and the center of mass collinear with one another.

49. An instrument as defined in claim 41, wherein:
the arrangement of optical elements includes at least one optical path length adjusting element in one beam arm to adjust the optical path length of the one beam arm to equal the optical path length of the other beam arm at one predetermined point during the simultaneous freefall of the test masses.

50. An instrument as defined in claim 41, wherein:
the first and second light beams respectively supplied to the first and second beam arms are derived from a single input light beam;
the first and second light beams from the first and second beam arms are combined into a single output light beam after the first and second light beams have impinged upon and reflected from the first and second test masses in the first and second beam arms; and
the first and second beam arms are equal in optical path length from the derivation of the first and second light beams from the single input light beam until the combination of the first and second light beams into the single output light beam except for deviation in the optical path lengths of the first and second beam arms occurring during simultaneous freefall of the test masses.

51. An instrument as defined in claim 41, wherein:
the instrument is a gravimeter; and
the characteristic of gravity is a gradient of gravity.

52. An instrument as defined in claim 41, wherein:
the first and second light beams from the first and second beam arms are combined into a single output light beam after the first and second light beams have impinged upon and reflected from the first and second test masses in the first and second beam arms; and
the characteristic of gravity is directly defined by the interferometric information contained in the combination of the first and second light beams in the single output beam.

53. An instrument as defined in claim 41, wherein:
the movement paths of the first and second test masses are collinear.

54. A method of detecting a characteristic of gravity, comprising:
simultaneously freefalling first and second test masses solely under respectively different influences of gravity in parallel movement paths;
respectively directing first and second light beams in first and second beam arms, the first and second beam arms are respectively separate and different from one another, and the first and second beam arms have respectively equal optical path lengths which the first and second light beams respectively traverse;
impinging the first light beam upon and reflecting the first light beam from both test masses during simultaneous freefall of the test masses;
impinging the second light beam upon and reflecting the second light beam from both test masses during simultaneous freefall of the test masses;
deviating the optical path lengths of the first and second beam arms from equality by respectively different influences of gravity on each test mass during simultaneous freefall of the test masses and by any respective difference in relative velocities of the test masses upon commencement of simultaneous freefall of the test masses;
combining the first and second light beams delivered from the first and second beam arms after each light beam has impinged upon and reflected from both test masses during simultaneous freefall; and
directly determining the characteristic of gravity from interferometric information contained in the combination of the first and second light beams.

55. A method as defined in claim 54, wherein:
deviating the optical path length of one beam arm oppositely of the deviation of the optical path length of the other beam arm.

56. A method as defined in claim 54, wherein:
deviating the optical path length of one beam arm equally to the deviation of the optical path length of the other beam arm.

57. A method as defined in claim 54, wherein:
deviating the optical path length of one beam arm equally to and oppositely from the deviation of the optical path length of the other beam arm.

58. A method as defined in claim 54, further comprising:
orienting a first surface of each test mass in the direction of freefall of the test masses;
orienting a second surface of each test mass in the opposite direction of freefall of the test masses;
directing the first light beam in the first beam arm to impinge upon and reflect from the first surface of one test mass and the second surface of the other test mass; and
directing the second light beam in the second beam arm to impinge upon and reflect from the second surface of the one test mass and the first surface of the other test mass.

59. A method as defined in claim 58, further comprising:
reflecting the light beam from each surface of each test mass parallel to the light beam which impinges on that surface.

60. A method as defined in claim 58, further comprising:
using a retroreflector as each surface of each test mass, each retroreflector having an optical center point;
establishing a center of mass of each test mass;
locating the retroreflectors on each test mass with the optical center points of the retroreflectors separated at finite equal distances from the center of mass of each test mass; and
locating the optical center points and the center of mass of each test mass collinearly with one another in each test mass.

61. A method as defined in claim 54, further comprising:
adjusting the optical path length of one beam arm to equal the optical path length of the other beam arm at one predetermined point of the simultaneous freefall of both test masses.

62. A method as defined in claim 54, further comprising:
deriving the first and second light beams respectively supplied to the first and second beam arms from a single input light beam;
combining the first and second light beams from the first and second beam arms into a single output light beam after the first and second light beams have impinged upon and reflected from the first and second test masses in the first and second beam arms; and wherein:
the first and second beam arms are equal in optical length from the derivation of the first and second light beams from the single input light beam until the combination of the first and second light beams into the single output light beam except for deviation in the optical path lengths of the first and second beam arms occurring during simultaneous freefall of the test masses.

63. A method as defined in claim 54, further comprising:
detecting a gradient of gravity as the characteristic of gravity.

64. A method as defined in claim 54, further comprising:
simultaneously freefalling the first and second test masses in collinear movement paths.

65. An instrument for detecting a characteristic of acceleration comprising a pair of test masses which move simultaneously in collinear movement paths under respectively different influences of the acceleration characteristic, and a pair of light beams which each traverse separate and different optical beam paths and which each impinge upon and reflect from both test masses during the simultaneous movement of the test masses in the collinear movement paths, the pair of light beams when interferometrically combined after impinging upon and reflecting from the test masses containing interferometric information which directly represents the acceleration characteristic.

66. An instrument as defined in claim 65 wherein the characteristic of acceleration is a gradient of gravity and the instrument is a gradiometer.

67. An instrument as defined in claim 65 wherein the light beams traverse optical beam paths which extend parallel to one another and to the collinear movement paths when impinging upon and reflecting from the test masses moving simultaneously in the collinear movement paths.

68. An instrument as defined in claim 65 wherein:

the optical path lengths of the light beams are equal except for a deviation in the optical path lengths of the light beams arising from the respective different influences of acceleration on each test mass during simultaneous movement of the test masses in the collinear movement paths and except for any deviation arising from any respective difference in relative velocities of the test masses upon commencement of simultaneous movement of the test masses in the collinear movement paths.

69. A method of detecting a characteristic of acceleration comprising:

simultaneously moving a pair of test masses in collinear movement paths solely under respectively different influences of acceleration; and directing a pair of light beams to traverse respectively separate and different optical [M] beam paths to each impinge upon and reflect from both test masses moving simultaneously in the collinear movement paths;

combining both light beams after having impinged upon and reflected from both test masses moving simultaneously in the collinear movement paths to create interferometric information; and detecting the characteristic of acceleration directly from the interferometric information contained in the combination of the light beams.

70. A method as defined in claim 69 wherein the characteristic of acceleration is a gradient of gravity and the detection includes measuring the gradient of gravity.

71. A method as defined in claim 69 wherein the optical beam paths extend parallel to the collinear movement paths when impinging upon and reflecting from the test masses during simultaneous movement of the test masses in the collinear movement paths.

72. A method as defined in claim 69 wherein:

the optical path lengths of the light beams are equal except for a deviation in the optical path lengths arising from the respective different influences of acceleration on each test mass during simultaneous movement of the test masses in the collinear movement paths and except for any deviation arising from any difference in relative velocities of the test masses upon commencement of simultaneous movement of the test masses in the collinear movement paths.

73. A gradiometer as defined in claim 11, wherein:

the test masses are vertically separated and vertically spaced with respect to one another during simultaneous freefall; and both of the first and second surfaces of the one test mass are vertically separated and vertically spaced respect to both of the first and second surfaces of the other test mass.

74. A gradiometer as defined in claim 1, wherein:

each beam arm has an optical path length which the light in that beam arm traverses;

the optical path lengths of both the first and second beam arms change during simultaneous freefall of the test masses; and the change in the relative optical path lengths of the first and second beam arms is at least four times the amount of relative physical separation of the first and second test masses caused by the respectively different influences of gravity on the first and second test masses, during simultaneous freefall of the test masses.

75. A gradiometer as defined in claim 4, wherein:

each beam arm includes a plurality of segments;

the arrangement of optical elements causes one segment of the first beam arm to lengthen and another segment of the first beam arm to shorten during simultaneous freefall of the test masses; and the arrangement of optical elements causes one segment of the second beam arm to lengthen and another segment of the second beam arm to shorten during simultaneous freefall of the test masses.

76. A method as defined in claim 13, further comprising:

orienting a first surface of each test mass in the same direction of freefall;

orienting a second surface of each test mass in the opposite direction of freefall;

directing the first light beam in the first beam arm to impinge upon and reflect from the first surface of one test mass and the second surface of the other test mass; and directing the second light beam in the second beam arm to impinge upon and reflect from the second surface of the one test mass and the first surface of the other test mass.

77. A method as defined in claim 13, further comprising:

orienting a first surface of each test mass in the direction of freefall;

orienting a second surface of each test mass in the opposite direction of freefall;

vertically separating and vertically spacing the test masses with respect to one another during simultaneous freefall of the test masses; and vertically separating and vertically spacing both of the first and second surfaces of one test mass respect to both of the first and second surfaces of the other test mass during simultaneous freefall of the test masses.

78. A method as defined in claim 13, wherein each beam arm has an optical path length which the light beam in that beam arm traverses, and further comprising:

changing the optical path lengths of the first and second beam arms during simultaneous movement of the test masses in the collinear movement paths; and changing the difference in relative lengths of the optical path lengths of the first and second beam arms by at least four times the amount of relative physical separation of the first and second test masses caused by the respectively different influences of gravity on the first and second test masses, during simultaneous freefall of the test masses.

79. A method as defined in claim 14, further comprising:

forming each beam arm as a plurality of segments;

lengthening one segment of the first beam arm and shortening another segment of the first beam arm during simultaneous freefall of the test masses; and lengthening one segment of the second beam arm and shortening another segment of the second beam arm during simultaneous freefall of the test masses.

80. An instrument as defined in claim 45, wherein:

the test masses are vertically separated and vertically spaced with respect to one another during simultaneous freefall; and both of the first and second surfaces of the one test mass are vertically separated and vertically spaced respect to both of the first and second surfaces of the other test mass.

81. An instrument as defined in claim 41, wherein:

the optical path lengths of both the first and second beam arms change during simultaneous freefall of the test masses; and the change in the relative optical path lengths of the first and second beam arms is at least four times the amount of relative physical separation of the first and second test masses caused by the respectively different influences of gravity on the first and second test masses, during simultaneous freefall of the test masses.

82. An instrument as defined in claim 41, wherein:
each beam arm includes a plurality of segments;
the arrangement of optical elements causes one segment of the first beam arm to lengthen and another segment of the first beam arm to shorten during simultaneous freefall of the test masses; and
the arrangement of optical elements causes one segment of the second beam arm to lengthen and another segment of the second beam arm to shorten during simultaneous freefall of the test masses.

83. A method as defined in claim 54, further comprising:
orienting a first surface of each test mass in the direction of freefall of the test masses;
orienting a second surface of each test mass in the opposite direction of freefall of the test masses;
vertically separating and vertically spacing the test masses with respect to one another during simultaneous freefall of the test masses; and
vertically separating and vertically spacing both of the first and second surfaces of one test mass respect to both of the first and second surfaces of the other test mass during simultaneous freefall of the test masses.

84. A method as defined in claim 54, further comprising:
changing the optical path lengths of the first and second beam arms during simultaneous movement of the test masses in the collinear movement paths; and
changing the relative optical path lengths of the first and second beam arms by at least four times the amount of relative physical separation of the first and second test masses caused by the respectively different influences of gravity on the first and second test masses, during simultaneous freefall of the test masses.

85. A method as defined in claim 54, further comprising:
forming each beam arm as a plurality of segments;
lengthening one segment of the first beam arm and shortening another segment of the first beam arm during simultaneous freefall of the test masses; and
lengthening one segment of the second beam arm and shortening another segment of the second beam arm during simultaneous freefall of the test masses.

86. An instrument as defined in claim 65, wherein:
each light beam traverses an optical path length when impinging upon and reflecting from the test masses during simultaneous movement of the test masses in the collinear movement paths;
the optical path lengths of the light beams change during simultaneous movement of the test masses in the collinear movement paths; and
the change in the optical path length of one light beam is opposite of the change in the optical path length of the other light beam.

87. An instrument as defined in claim 65, wherein:
the optical path lengths of the light beams change during simultaneous movement of the test masses in the collinear movement paths; and
the change in the optical path length of one light beam is equal to the change in the optical path length of the other light beam.

88. An instrument as defined in claim 65, wherein:
the optical path lengths of the light beams change during simultaneous movement of the test masses in the collinear movement paths; and
the change in the optical path length of one light beam is equal to and opposite of the change in the optical path length of the other light beam.

89. An instrument as defined in claim 65, wherein:
each test mass has a first surface oriented in the direction of collinear movement and a second surface oriented in the opposite direction of collinear movement;
the one light beam impinges upon and reflects from the first surface of one test mass and the second surface of the other test mass; and
the other light beam impinges upon and reflects from the second surface of the one test mass and the first surface of the other test mass.

90. An instrument as defined in claim 65, wherein:
each test mass has a first surface oriented in the direction of collinear movement and a second surface oriented in the opposite direction of collinear movement;
the test masses are vertically separated and vertically spaced with respect to one another during simultaneous movement of the test masses in the collinear movement paths; and
both of the first and second surfaces of the one test mass are vertically separated and vertically spaced respect to both of the first and second surfaces of the other test mass.

91. An instrument as defined in claim 65, wherein:
the optical path lengths of the light beams change during simultaneous movement of the test masses in the collinear movement paths; and
the change in the relative optical path lengths of the pair of light beams is at least four times the amount of relative physical separation of the pair of test masses caused by the respectively different influences of acceleration on the test masses, during simultaneous movement of the test masses in the collinear movement paths.

92. A method as defined in claim 69, further comprising:
changing the optical path lengths of the light beams during simultaneous movement of the test masses in the collinear movement paths; and
changing the optical path length of one light beam oppositely of the change of the optical path length of the other light beam.

93. A method as defined in claim 69, further comprising:
changing the optical path lengths of the light beams during simultaneous movement of the test masses in the collinear movement paths; and
changing the optical path length of one light beam equally to the change of the optical path length of the other light beam.

94. A method as defined in claim 69, further comprising:
changing the optical path lengths of the light beams during simultaneous movement of the test masses in the collinear movement paths; and
changing the optical path length of one light beam equally to and oppositely from the change of the optical path length of the other light beam.

95. A method as defined in claim 69, further comprising:
orienting a first surface of each test mass in the direction of collinear movement;
orienting a second surface of each test mass in the opposite direction of collinear movement;
directing one light beam to impinge upon and reflect from the first surface of one test mass and the second surface of the other test mass; and
directing the other light beam to impinge upon and reflect from the second surface of the one test mass and the first surface of the other test mass.

96. A method as defined in claim 69, further comprising:
orienting a first surface of each test mass in the direction of collinear movement;
orienting a second surface of each test mass in the opposite direction of collinear movement;
vertically separating and vertically spacing the test masses with respect to one another during simultaneous movement of the test masses in the collinear movement paths; and
vertically separating and vertically spacing both of the first and second surfaces of one test mass respect to both of the first and second surfaces of the other test mass during simultaneous movement of the test masses in the collinear movement paths.

97. A method as defined in claim 69, further comprising:
changing the optical path lengths of the light beams during simultaneous movement of the test masses in the collinear movement paths; and
changing the relative optical path lengths of the light beams by at least four times the amount of relative physical separation of the test masses caused by the respectively different influences of acceleration on the test masses, during simultaneous movement of the test masses in the collinear movement paths.

98. An instrument as defined in claim 23, wherein:
the test masses are vertically separated and vertically spaced with respect to one another during simultaneous freefall; and
both of the first and second surfaces of the one test mass are vertically separated and vertically spaced respect to both of the first and second surfaces of the other test mass.

99. An instrument as defined in claim 21, wherein:
each beam arm has an optical path length which the light beam in that beam arm traverses;
the optical path lengths of both the first and second beam arms change during simultaneous freefall of the test masses; and
the change in the relative optical path lengths of the first and second beam arms is at least four times the amount of relative physical separation of the first and second test masses caused by the respectively different influences of gravity on the first and second test masses, during simultaneous freefall of the test masses.

100. An instrument as defined in claim 21, wherein:
each beam arm includes a plurality of segments;
the arrangement of optical elements causes one segment of the first beam arm to lengthen and another segment of the first beam arm to shorten during simultaneous freefall of the test masses; and
the arrangement of optical elements causes one segment of the second beam arm to lengthen and another segment of the second beam arm to shorten during simultaneous freefall of the test masses.

101. A method as defined in claim 32, further comprising:
orienting a first surface of each test mass in the direction of freefall of the test masses;
orienting a second surface of each test mass in the opposite direction of freefall of the test masses;
vertically separating and vertically spacing the test masses with respect to one another during simultaneous freefall of the test masses; and
vertically separating and vertically spacing both of the first and second surfaces of one test mass respect to both of the first and second surfaces of the other test mass during simultaneous freefall of the test masses.

102. A method as defined in claim 32, wherein each beam arm has an optical path length which the light beam in that beam arm traverses when impinging upon and reflecting from the test masses, and further comprising:
changing the optical path lengths of the first and second beam arms during simultaneous movement of the test masses in the collinear movement paths; and
changing the relative optical path lengths of the first and second beam arms by at least four times the amount of relative physical separation of the first and second test masses caused by the respectively different influences of gravity on the first and second test masses, during simultaneous freefall of the test masses.

103. A method as defined in claim 32, further comprising:
forming each beam arm as a plurality of segments;
lengthening one segment of the first beam arm and shortening another segment of the first beam arm during simultaneous freefall of the test masses; and
lengthening one segment of the second beam arm and shortening another segment of the second beam arm during simultaneous freefall of the test masses.

* * * * *